US011450190B2

(12) United States Patent
Cook et al.

(10) Patent No.: US 11,450,190 B2
(45) Date of Patent: Sep. 20, 2022

(54) PROXIMITY DETECTION TO AVOID NEARBY SUBJECTS

(71) Applicant: The Boeing Company, Chicago, IL (US)

(72) Inventors: Rebecca Leigh Cook, Charleston, SC (US); James W. Fonda, North Charleston, SC (US); Stephen Eric Moyer, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 4 days.

(21) Appl. No.: 16/853,480

(22) Filed: Apr. 20, 2020

(65) Prior Publication Data
US 2021/0327240 A1    Oct. 21, 2021

(51) Int. Cl.
*G08B 21/02*   (2006.01)
*G06F 1/16*    (2006.01)
*G08B 21/22*   (2006.01)
*G08B 21/24*   (2006.01)

(52) U.S. Cl.
CPC ............. *G08B 21/02* (2013.01); *G06F 1/163* (2013.01); *G08B 21/22* (2013.01); *G08B 21/245* (2013.01)

(58) Field of Classification Search
CPC ...... G08B 21/02; G08B 21/22; G08B 21/245; G06F 1/163
See application file for complete search history.

(56) References Cited

U.S. PATENT DOCUMENTS

| | | | | |
|---|---|---|---|---|
| 5,724,313 A | * | 3/1998 | Burgess | G01S 15/88 367/116 |
| 5,970,433 A | * | 10/1999 | Oka | G01S 7/4811 702/159 |
| 5,982,286 A | * | 11/1999 | Vanmoor | G01S 15/04 340/573.4 |
| 9,773,391 B1 | * | 9/2017 | Foshee | G01S 15/93 |
| 9,965,936 B1 | * | 5/2018 | Epps | G08B 21/02 |
| 10,535,280 B2 | * | 1/2020 | Kohn | G09B 21/006 |

(Continued)

OTHER PUBLICATIONS

Naughton, Keith, Ford Tests Buzzing Wristbands to Keep Workers at Safe Distances, Bloomberg, Apr. 15, 2020, p. 1-4, New York City, New York.

(Continued)

*Primary Examiner* — Hai Phan
*Assistant Examiner* — Son M Tang
(74) *Attorney, Agent, or Firm* — Quinn IP Law

(57) ABSTRACT

A proximity detection apparatus for avoidance of nearby subjects includes an article, a detector, an alert device and a controller. The article is for a user. The detector is configured to generate a detected value in response to sensing infrared radiation emitted from a subject in a vicinity of the article. The alert device is configured to generate an alert in response to a control signal. The controller is in communication with the detector and the alert device. The controller is configured to set a first predetermined value associated with a proximity condition of an unacceptable proximity range, configured to determine when the detected value exceeds the first predetermined value, and generate the control signal to the alert device to present the alert to inform the user that the subject is within the unacceptable proximity range.

20 Claims, 16 Drawing Sheets

(56) References Cited

U.S. PATENT DOCUMENTS

| | | | | |
|---|---|---|---|---|
| 10,638,248 | B1* | 4/2020 | Dodds | G10K 11/17813 |
| 10,860,864 | B2* | 12/2020 | Ghessassi | G01M 3/202 |
| 11,044,961 | B1* | 6/2021 | Craig | A42B 3/046 |
| 2001/0052844 | A1* | 12/2001 | Shirai | B60Q 9/008 |
| | | | | 340/435 |
| 2005/0122218 | A1* | 6/2005 | Goggin | G01S 17/931 |
| | | | | 340/552 |
| 2005/0248445 | A1* | 11/2005 | Matsuoka | B60Q 9/008 |
| | | | | 340/435 |
| 2012/0119920 | A1* | 5/2012 | Sallop | A61H 3/061 |
| | | | | 340/686.6 |
| 2012/0162636 | A1* | 6/2012 | Sy | G06F 1/3231 |
| | | | | 356/51 |
| 2014/0245785 | A1* | 9/2014 | Proud | G06K 7/10891 |
| | | | | 63/1.13 |
| 2015/0285906 | A1* | 10/2015 | Hooper | G01S 7/412 |
| | | | | 342/21 |
| 2016/0203689 | A1* | 7/2016 | Hintz | G08B 13/19695 |
| | | | | 348/155 |
| 2017/0206423 | A1* | 7/2017 | Ju | G06K 9/4604 |
| 2018/0078444 | A1* | 3/2018 | Gamerman | A61H 3/061 |
| 2018/0151047 | A1* | 5/2018 | Brunner | A61B 5/6804 |
| 2018/0208112 | A1* | 7/2018 | Tayama | G08G 1/16 |
| 2018/0261067 | A1* | 9/2018 | Bostick | G08B 21/0476 |
| 2019/0043384 | A1* | 2/2019 | Buser | G01V 3/08 |
| 2019/0122524 | A1* | 4/2019 | Milhem | G08B 21/0469 |
| 2019/0287382 | A1* | 9/2019 | Siembab | G08B 13/19621 |
| 2019/0333178 | A1* | 10/2019 | Cheng | G06Q 10/20 |
| 2019/0340909 | A1* | 11/2019 | Nguyen | G08B 21/02 |
| 2020/0304690 | A1* | 9/2020 | Zweigle | G01C 21/165 |
| 2021/0063569 | A1* | 3/2021 | Crew | G01S 15/42 |
| 2021/0287511 | A1* | 9/2021 | Clark | G08B 23/00 |

OTHER PUBLICATIONS https://www.adafruit.com/product/189, PIR (motion) sensor, visited Apr. 19, 2020.

https://www.sparkfun.com/products/8449, Vibration Motor, visited Apr. 19, 2020.

https://www.sparkfun.com/products/10917, Surface Transducer—Small, visited Apr. 19, 2020.

https://www.adafruit.com/product/1674, Bone Conductor Transducer with Wires—8 Ohm 1 Watt, visited Apr. 19, 2020.

Proximity Sensors—PL Pyroelectric Infrared Sensors, p. 1-8, Feb. 12, 2019, Kemet Electronics Corporation.

* cited by examiner

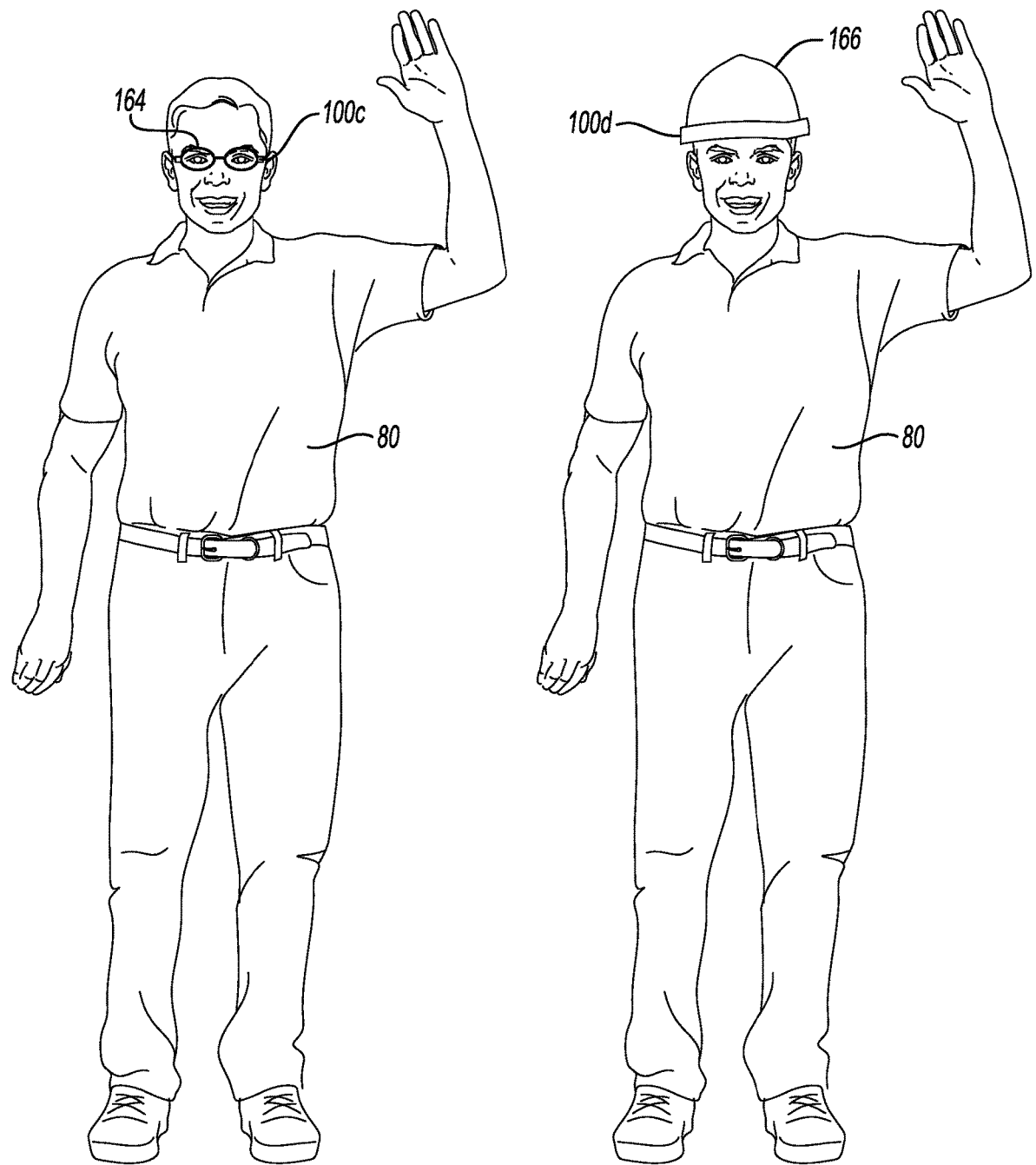

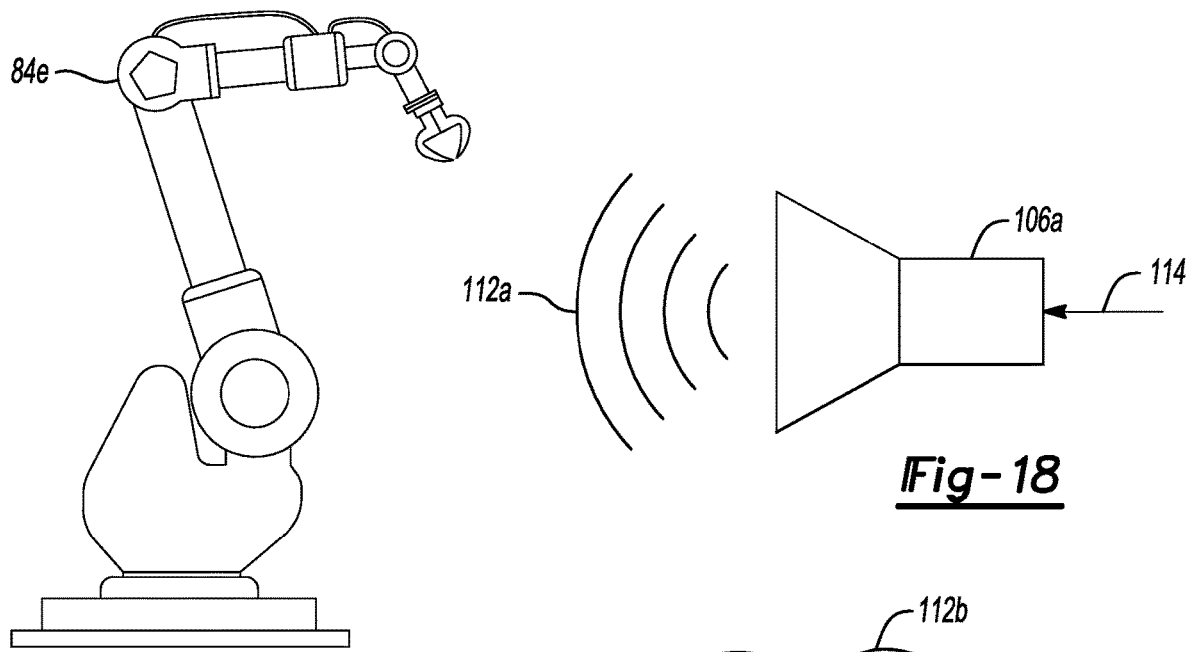
Fig-17
Fig-18
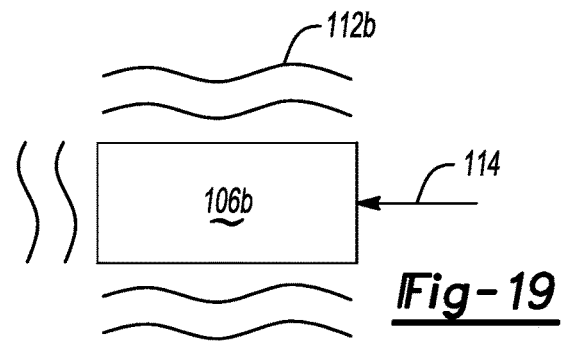
Fig-19
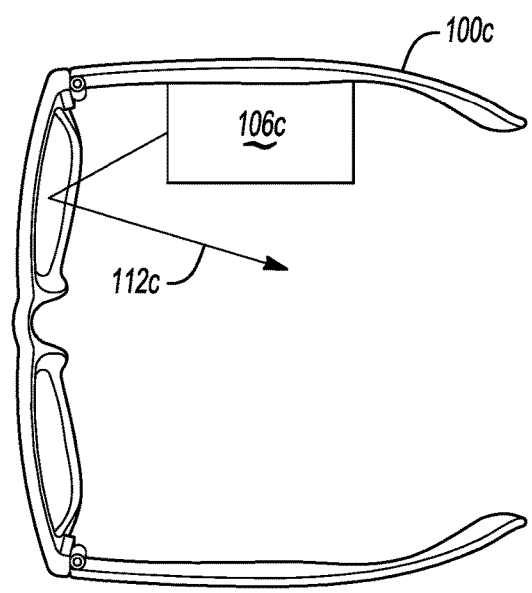
Fig-20

PROXIMITY DETECTION TO AVOID NEARBY SUBJECTS

TECHNICAL FIELD

The disclosure relates generally to proximity detection, and in particular, to a proximity detection apparatus and method to avoid nearby subjects.

BACKGROUND

Contaminants and infectious agents create concerns in the workplace. In particular, maintaining proper social distances among coworkers is a challenge. People are not used to being conscious of how close they are to other people and/or machinery, or estimating what number of people is acceptable for a congregating group. There is a need to help people be aware of their distance from others as well as how large a group is getting.

SUMMARY

Disclosed herein is a proximity detection apparatus for avoidance of nearby subjects. The proximity detection apparatus includes an article, a detector, an alert device, and a controller. The article is for a user. The detector is disposed on the article and is configured to generate a detected value in response to sensing infrared radiation emitted from a subject in a vicinity of the article. The alert device is disposed on the article and is configured to generate an alert in response to a control signal. The controller is in communication with the detector and the alert device. The controller is configured to set a first predetermined value associated with a proximity condition of an unacceptable proximity range. The controller is configured to determine when the detected value exceeds the first predetermined value, and generate the control signal to the alert device to present the alert to inform the user that the subject is within the unacceptable proximity range.

In one or more embodiments of the proximity detection apparatus, the detector may include a plurality of detectors that are each positioned at a predetermined spacing along the article. The plurality of detectors may be configured to generate a plurality of detected values. The plurality of detectors may establish a plurality of fields of view that surround the proximity detection apparatus in a horizontal plane.

In one or more embodiments of the proximity detection apparatus, the subject is a plurality of subjects. The plurality of detectors may be spatially oriented in a plurality of directions to individually detect the plurality of subjects in the vicinity of the proximity detection apparatus. The controller is configured to detect one or more of the plurality of subjects within the unacceptable proximity range by comparing the plurality of detected values with the first predetermined value. The controller may configured to generate the control signal in response to determining that one or more of the plurality of detected values exceeds the first predetermined value.

In one or more embodiments of the proximity detection apparatus, the alert device includes a plurality of alert devices that are each positioned at a different location on the article. The plurality of alert devices may be configured to generate a plurality of alerts in response to a plurality of control signals.

In one or more embodiments of the proximity detection apparatus, the controller is further configured to determine each direction toward each of the plurality of the subjects that are within the unacceptable proximity range where the respective detected value exceeds the first predetermined value, and generate the plurality of control signals to present a corresponding alert to the user in each direction of a corresponding subject determined to be within the unacceptable proximity range.

In one or more embodiments of the proximity detection apparatus, the controller is further configured to generate the control signal to adjust one or more of an amplitude of the alert, a frequency of the alert, a visual aspect of the alert, a duty cycle of the alert, or any combination thereof in response to a number of the plurality of detected values that exceed the first predetermined value.

In one or more embodiments of the proximity detection apparatus, the controller is further configured to generate the control signal to command the alert device to generate the alert including a warning to the user while a number of the proximity conditions that are true exceeds a warning value to inform the user that a group of the plurality of subjects are nearby.

In one or more embodiments, the proximity detection apparatus further includes a transmitter in communication with the controller. The controller is further configured to transmit a message signal through the transmitter to an external device in response to detection of one or more subjects within the unacceptable proximity range where the respective detected value exceeds the first predetermined value.

In one or more embodiments of the proximity detection apparatus, the article is a wearable article, and the wearable article is a belt, a bracelet, eyeglasses, a hat, a necklace, an ankle, a glove, a shoe attachment, a leg band, a clip or an arm band.

In one or more embodiments of the proximity detection apparatus, the detector is a passive infrared sensor that generates a detected voltage value that increases with the increase of infrared radiation as the subject comes closer to the detector. The controller may be configured to adjustably set the first predetermined value associated with the proximity condition of the unacceptable proximity range to a select voltage threshold, and adjust a distance of the unacceptable proximity range in determining when the detected voltage value resulting from the infrared radiation from the subject exceeds the select voltage threshold.

In one or more embodiments of the proximity detection apparatus, the alert device is one or more of an acoustic device, a tactile device, a visual device, or any combination thereof.

In one or more embodiments of the proximity detection apparatus, the article is configured to be worn by an assembly operator in a facility.

In one or more embodiments of the proximity detection apparatus, the subject is a person, a vehicle, a robotic device, an object at a fixed location, or any combination thereof.

In one or more embodiments of the proximity detection apparatus, the alert remains active during a duration that the detected value exceeds the first predetermined value for determining that the subject is within the unacceptable proximity range, where the subject in the vicinity exposes the user to one or more of a contaminant, an airborne infectious agent, or both.

Disclosed herein is a method for proximity detection for avoidance of nearby subjects. The method includes donning, by a user, an article having a detector and an alert device. The detector is in communication with a controller and is configured to generate a detected value by sensing infrared radiation emitted from a subject in a vicinity of the article. The alert device is in communication with the controller and is configured to generate an alert in response to a control signal. The method includes setting, by the controller, a first predetermined value associated with a proximity condition of an unacceptable proximity range for intrusion by the subject. The method includes determining when the detected value exceeds the first predetermined value. The method also includes generating, by the controller, the control signal to command the alert device to present the alert to inform the user that the subject is within the unacceptable proximity range.

In one or more embodiments, the method further includes adjusting the setting of the first predetermined value associated with the proximity condition of the unacceptable proximity range to a select value to adjust a distance of the unacceptable proximity range in which the subject can intrude.

In one or more embodiments, the method further includes suppressing the alert in response to the first predetermined value for the proximity condition being exceeded by the detected value for less than a dwell time.

In one or more embodiments, the detector is a plurality of detectors and the subject is a plurality of subjects, the method further includes generating, by the controller, the control signal to command the alert device to present the alert including a warning to the user when more than a predetermined number of the plurality of detectors generate the detected values of the infrared radiation in excess of the first predetermined value thereby indicating that more than the predetermined number of the plurality of subjects are nearby.

In one or more embodiments of the method, the proximity condition is one of true or false, where the controller is configured for setting the proximity condition to true while the detected value is less than the first predetermined value and greater than a second first predetermined value for a dwell time.

Disclosed herein is a method of fabricating a proximity detection apparatus. The method includes positioning a detector on an article, the detector being configured to generate a detected value by sensing infrared radiation emitted from a subject in a vicinity of the article, wherein the article is for a user. The method includes positioning an alert device on the article, wherein the alert device is configured to generate an alert in response to a control signal. The method includes connecting a controller to the detector and the alert device on the article, wherein the controller is configured to set a first predetermined value associated with a proximity condition of an unacceptable proximity range, determine when the detected value exceeds the first predetermined value, and generate the control signal to command the alert device to present the alert to inform the user that the subject is detected within the unacceptable proximity range.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 6 is a schematic diagram of still another proximity detection apparatus in accordance with an exemplary embodiment.

FIG. 7 is a schematic diagram of another proximity detection apparatus in accordance with an exemplary embodiment.

FIG. 17 is a schematic diagram of another subject in accordance with an exemplary embodiment.

FIG. 18 is a schematic diagram of an alert device in accordance with an exemplary embodiment.

FIG. 19 is a schematic diagram of another alert device in accordance with an exemplary embodiment.

FIG. 20 is a schematic diagram of still another alert device in accordance with an exemplary embodiment.

DETAILED DESCRIPTION

Figure 1:
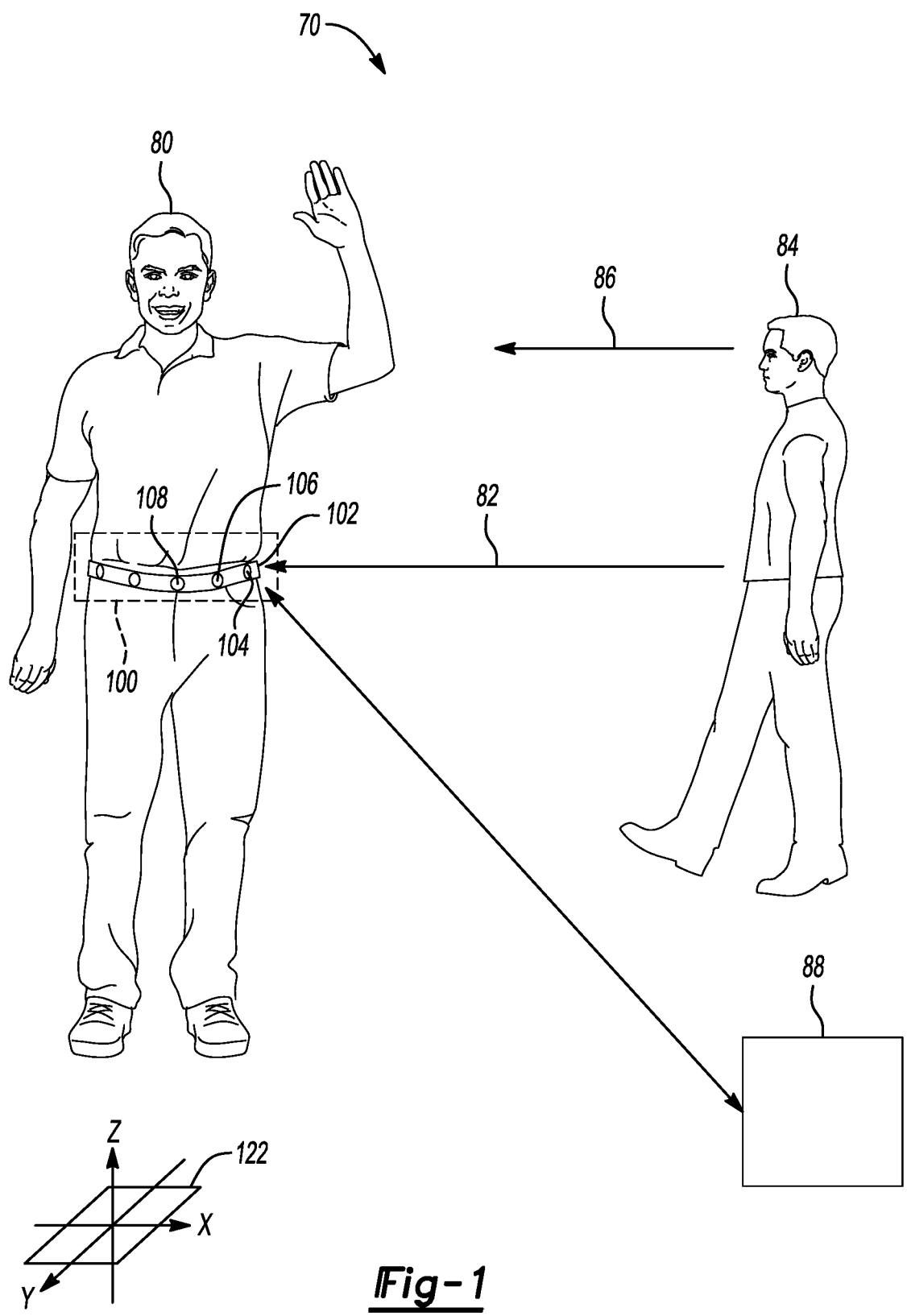
FIG. 1 is a schematic diagram of a system in accordance with an exemplary embodiment.

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

Embodiments of the present disclosure may include an apparatus and/or methods that assists people in identifying distance from others and sizes of groups while also training the people to become more aware of these things on their own going forward. This apparatus and/or methods may be updatable with new thresholds as standards and governance mandates change. In various embodiments, a wearable article includes a ring of embedded sensors (e.g., 4 to 10 detectors), concentric with a ring of embedded alert devices (e.g., 4 to 8 alert device). Using an analog output voltage of the detectors, a distance and/or direction from the wearable article to one or more subjects is transferred to a controller (e.g., one or more local processing systems). While the subject is detected within an unacceptable proximity range, control signals are provided to the alert devices to produce alerts. A frequency, amplitude, duty cycle and/or visual aspects of the alerts are adjustable via the control signals and adjustable settings. The frequency could be sub-audio so as to be perceived as a vibration. The alert could also be scaled into audible ranges. The proximity detection apparatus may be powered by a battery pack. The battery pack generally includes a AAA battery pack, Universal Serial Bus rechargeable system for a Lithium Polymer battery, or similar.

Referring to FIG. 1, a schematic diagram of an example implementation of a system 70 is shown in accordance with an exemplary embodiment. The system 70 generally includes a user (or person) 80, a subject 84, a contaminant and/or an infectious agent 86, an external device 88, and a proximity detection apparatus 100. The proximity detection apparatus 100 includes a wearable article 102, one or more detectors (one shown) 104, one or more alert devices (one shown) 106, and a controller 108. The user 80 and the subject 84 are generally coplanar in a horizontal plane 122. The horizontal plane 122 is shown in the X axis and the Y axis of a Cartesian coordinate system. The Z axis is oriented vertically.

An infrared radiation 82 is emitted by the subject 84 and received by the detector 104. The contaminant and/or infectious agent 86 is potentially transmittable from the subject 84 to the user 80. In various embodiments, a message 90 may be exchanged between the proximity detection apparatus 100 and the external device 88. The message 90 may be conveyed by a wired and/or wireless communication channel.

The user 80 is a person who wears the proximity detection apparatus 100. In some situations, the user 80 may be an assembly operator in a facility. Other types of users 80 may wear the proximity detection apparatus 100 to meet the criteria of a particular environment.

The subject 84 may be another person and/or machines. In various embodiments, the subject 84 may be a robotic device, an object at a fixed location, and/or a vehicle (e.g., a forklift). The subject 84 emits, or reflects, the infrared radiation 82. The subject 84 may be a source of the contaminant and/or infectious agent 86.

The external device 88 may be one or more computers or other data storage devices (one shown) that are configured to communicate with the proximity detection apparatus 100. The external devices 88 are generally located remote from the user 80. For example, the external devices 88 may be in a different locations of the same room as the user 80, in different rooms in the same building as the user 80 and/or in different buildings where the user 80 may visit. Communication with the proximity detection apparatus 100 is provided by the message signal 90. In various embodiments, the message signal 90 may be conveyed by a wired communication channel, such as Ethernet, Fire Wire, an RS-232 bus, or the like. In other embodiments, the message signal 90 may be conveyed by a wireless communication channel, such as WiFi, Bluetooth, wireless Ethernet, cellular systems, XBee, or the like.

The proximity detection apparatus 100 is suitable for avoidance of nearby subjects 84. The proximity detection apparatus 100 includes the wearable article 102 configured to be carried (e.g., to be worn or have on one's person) by the user 80. The proximity detection apparatus 100 also includes the detector 104 disposed on the wearable article 102 and configured to generate a detected value in response to sensing the infrared radiation 82 emitted from the subject 84 in a vicinity of the wearable article 102. The alert device 106 is disposed on the wearable article 102 and is configured to generate an alert in response to a control signal.

The controller 108 is in communication with the detector 104 and the alert device 106. The controller 108 is configured to determine when the detected value exceeds the predetermined value, and generate the control signal to the alert device 106 to present the alert to inform the user 80 that the subject 84 is within the unacceptable proximity range. A nearby subject 84 may be found to be within the unacceptable proximity range where the detected value exceeds a predetermined value of a voltage value, for example, or where the detected value exceeds a predetermined value that is a percentage increase, such as a 10 percent increase for example, where the detected value has increased from a prior-received detected value by more than the percentage increase.

In some embodiments, the controller 108 may be configured to set the first predetermined value associated with a proximity condition of an unacceptable proximity range. The proximity condition may be one of true or false. Thereafter, the controller 108 is configured for setting the proximity condition to true while the detected value is less than a first predetermined value and greater than a second predetermined value for a dwell time.

Various designs of the controller 108 may implement the controller functionality in software executing on one or more processors. Other designs may divide the functionality between dedicated hardware circuitry and the software. Still other designs may be implemented solely in hardware. Where space, size and/or power are limited, the functionality of the controller 108 may be implemented outside of the proximity detection apparatus 100 (e.g., in the external device 88). In such designs, the controller 108 may act as a conduit between the other circuits within the proximity detection apparatus 100 and the software performing the controller functions. In some embodiments, some to most of the functionality of the controller 108 and the alert device 106 may be implemented in a portable device that may be carried by the user 80. For example, the carried device could be a cell phone or similar smart device. The manual inputs are received through the touch screen/keypad of the cell phone. The alert 112 may be generated by the phone's buzzing and/or images on the touch screen.

Figure 2:
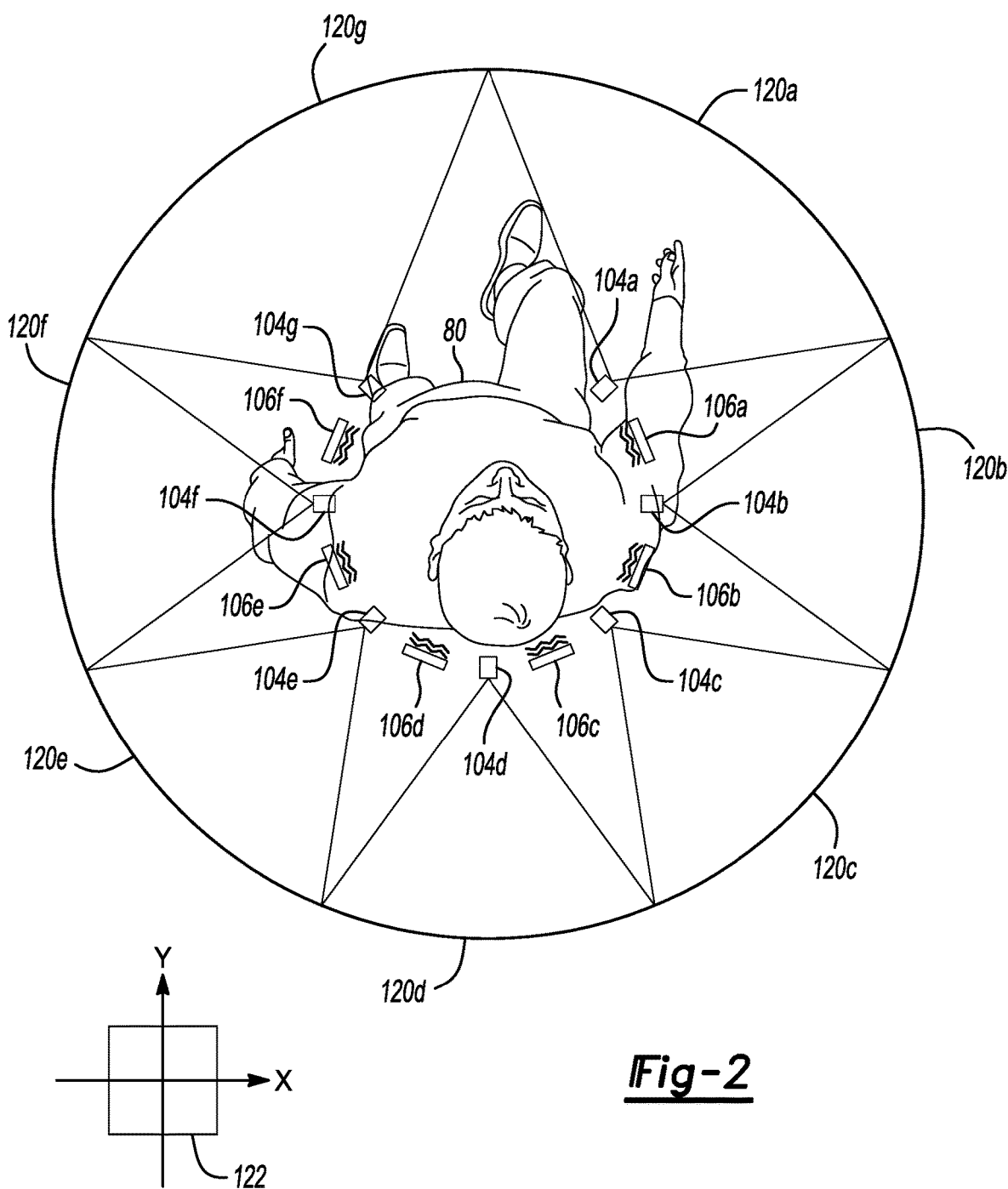
FIG. 2 is a schematic plan diagram of a user in accordance with an exemplary embodiment.

Referring to FIG. 2, a schematic plan diagram of an example top view of the user 80 is shown in accordance with an exemplary embodiment. The diagram is shown looking along the Z axis toward the horizontal plane 122. The user 80 may wear the proximity detection apparatus 100 around his or her waist. The proximity detection apparatus 100 is illustrated with multiple detectors 104*a*-104*g* and multiple alert devices 106*a*-106*f*.

Each detector 104*a*-104*g* may be positioned at a predetermined spacing along the wearable article 102 and spatially oriented in a plurality of directions. The detectors 104*a*-104*g* may establish multiple fields of view 120*a*-120*g* that surround the proximity detection apparatus 100 in the horizontal plane 122. The detectors 104*a*-104*g* may be configured to generate multiple detected values. In various embodiments, individual fields of view 120*a*-120*g* may overlap neighboring fields of view 120*a*-120*g*.

In various situations, the subject 84 may be multiple subjects 84. Therefore, the detectors 104*a*-104*g* may be spatially oriented in multiple directions to individually detect the subjects 84 in the vicinity of the proximity detection apparatus 100. The controller 108 may be configured to detect one or more of the subjects 84 within the unacceptable proximity range by comparing the detected values with the first predetermined value. The controller 108 may also generate the control signal in response to determining that one or more of the plurality of detected values exceeds the first predetermined value. Subsequently, the user 80 will be informed even if a sole subject 84 enters the unacceptable proximity range around the user 80.

Each alert device 106*a*-106*f* is generally positioned at a different location on the wearable article 102. The alert devices 106*a*-106*f* are configured to generate a plurality of alerts in response to a plurality of control signals. The controller 108 may be further configured to determine each direction toward each of the subjects 84 that are within the unacceptable proximity range where the respective detected value exceeds the first predetermined value. The controller 108 may also generate the control signals to present a corresponding alert to the user 80 in each direction of a corresponding subject 84 determined to be within the unacceptable proximity range.

By way of example, if the subject 84 is detected by the detector 104*b* to the right of the user 80, the controller 108 may command the alert device 106*b* to present the alert. As such, the user 80 may be informed that the subject 84 is somewhere to the right, even though the user 80 may not be able to see or hear the subject 84. In another example, if two subjects 84 are detected, one by the detector 104*a* and the other by the detector 104*d*, the controller 108 may command the alert device 106*a* to generate an alert to notify the user 80 of the subject 84 ahead. The controller 108 may also assert the control signals to both the alert devices 106*c* and 106*d* to generate respective alerts. Therefore, the user 80 may be informed that the other subject 84 is directly behind. The controller 108 may be designed to place a different emphasis on the alert 112 based on the direction of the subject 84. For example, if the subject 84 is approaching the front of the user 80, a probability of transferring the airborne infectious agent 86 (e.g., influenza) may be greater than if the subject 84 is approaching the back of the user 80. Therefore, the controller 108 may control the alert 112 at a higher notification level (e.g., louder) when the subject 84 is ahead of the user 80 rather than behind the user 80.

In various embodiments, the controller 108 may be configured to generate the individual control signals to adjust one or more of an amplitude of the alert, a frequency of the alert, a visual aspect of the alert, a duty cycle of the alert, or any combination thereof. The adjustments may be made in response to a number of the detected values that exceed the first predetermined value. For example, as the subject 84 gets closer to the user 80, an amplitude of an audible alert and/or a tactile alert may increase. In another example, a frequency of the audible alert may increase to indicate that the subject 84 is getting closer. A duty cycle of the audile alerts, the tactile alerts and/or visual alerts may be shortened as the subject 84 draws nearer. For example, the audible alerts may beep faster, the tactile alerts may pulse faster, and the visual alerts may flash faster as the distance to the subject 84 decreases. Visual aspects of the visual alerts may include changes in color on a display and/or an indicator (e.g., a light emitting diode) as the distance to the subject 84 changes. Other modulations of the alert may be implemented to meet the design criteria of a particular application.

The controller 108 may be configured to warn the user 80 when a number of the subjects 84 increases above a warning value that signifies the formation of a group or a crowd. A size of the group that would trigger the warning may be adjustable to account for different environments. In some environments, a small number of subjects 84 (e.g., 3 or more people) may be sufficient to merit a group warning. In other environments, a larger number of subjects 84 (e.g., 7 or more people) may be suitable to trigger the group warning. In various embodiments, the warning may be a change in the alert or an addition to the alert. In other embodiments, the warning may be separate from the alert. The warning may be generated by the alert devices 106*a*-106*f*.

The controller 108 may be configured to generate the control signals to command the alert devices 106*a*-106*f* to generate the alerts to include the warning to the user 80 while the number of the proximity conditions that are true exceeds a warning value. The warning generally informs the user 80 that a group of the subjects 84 are nearby.

Figure 3:
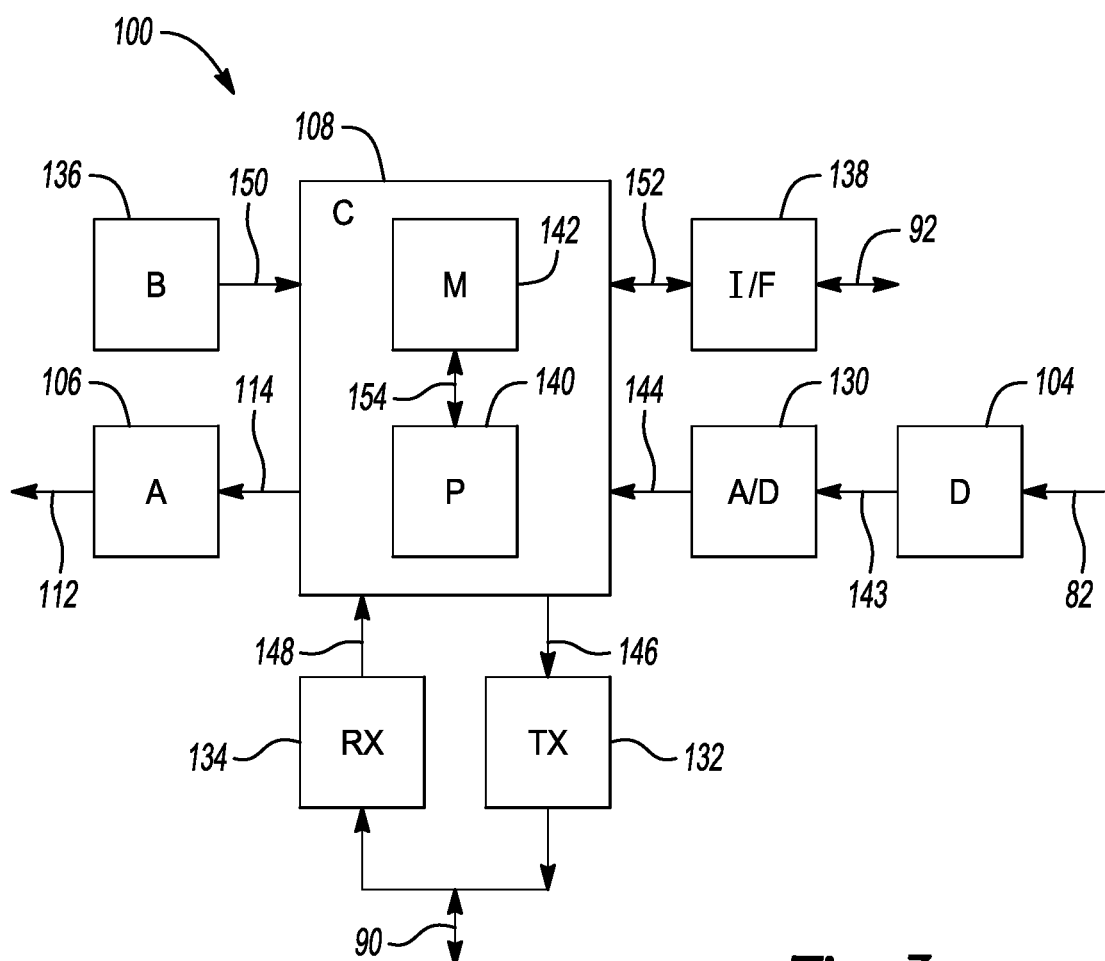
FIG. 3 is a schematic block diagram of the proximity detection apparatus in accordance with an exemplary embodiment.

Referring to FIG. 3, a schematic block diagram of an example implementation of the proximity detection apparatus 100 is shown in accordance with an exemplary embodiment. The proximity detection apparatus 100 may include one or more detectors 104 (one shown), one or more alert device 106 (one shown), the controller 108, an analog-to-digital (A/D) converter 130, an optional transmitter 132, an optional receiver 134, a battery 136 and an optional interface connector 138. The controller 108 generally includes at least a processor 140 and a memory 142.

The infrared radiation 82 is received by the detector 104. The message signal 90 may be exchanged between the transmitter 132 and the external device 88 (FIG. 1) and/or between the receiver 134 and the external device 88. The alert 112 is generated and presented by the alert device 106. The alert 112 may be an acoustic alert, a tactile (or haptic) alert and/or a visual alert. A configuration signal 92 may be received and/or sent by the controller 108 through the interface connector 138. The configuration signal 92 is an electrical signal that is transferred through the interface connector 138. A detected signal 143 may be generated by the detector 104 based on the amount of infrared radiation 82 that is sensed. The detected signal 143 may convey the detected value of the infrared radiation 82. The controller 108 may generate and present the control signal 114 to the alert device 106. The control signal 114 generally controls the alert device 106 when to assert the alert 112 and when to suppress the alert 112. The control signal 114 may also be used to adjust a frequency of the alert 112, a visual aspect of the alert 112, a duty cycle of the alert 112, or any combination thereof.

In various designs, the controller 108 may be disposed on the wearable article 102 and hardwired to the other circuitry. In other design, the controller 108 may be remote from the wearable article 102 and communicate with the other circuitry through the receiver 134 and the transmitter 132. In such designs, the controller 108 may be implemented in a portable device such as a cell phone, a tablet, a personal digital assistant, a notepad, and the like.

The detector 104 may implement an infrared detector. The detector 104 is generally operational to detect subjects moving through one or more fields (or windows) of view. The detector 104 generally senses in a specified cone-shaped window that extends both horizontally (e.g., X-Y axes) and vertically (e.g., Z axis). The detector 104 converts the infrared radiation 82 into the detected signal 143 (e.g., an analog signal) corresponding to detection and/or distance of the subject 84. In various embodiments, the detector 104 may include, but is not limited to, a passive infrared detector and an active detector. Example detectors 104 include a passive infrared motion sensor, product ID #189, available from Adafruit Industries LLC, New York, N.Y., and a pyroelectric infrared sensor, part number PL-N823-10, available from KEMET Electronics Corporation, Fort Lauderdale, Fla. Other types of detectors and/or detectors operating in different spectrums may be implemented to meet the design criteria of a particular application.

The alert device 106 may implement one or more of an acoustic device, a tactical device and/or a visual device. The alert device 106 is generally operational to inform the user 80 that at least one subject 84 is in the vicinity. In various embodiments, the alert device 106 may be a speaker, a tactile device, a display, a piezoelectric buzzer, a haptic motor, a bone conductor transducer, a surface transducer, or the like. Example alert devices 106 include, but are not limited to, a surface transducer COM-10917 available from Sparkfun Electronics, Niwot, Colo., a bone conductor transducer product ID 1674 available from Adafruit Industries LLC, and a vibration motor ROB-08449 ROHS available from Sparkfun Electronics.

The controller 108 may be configured to transmit the message signal 90 through the transmitter 132 to the external device 88 in response to detection of one or more subjects 84 within the unacceptable proximity range where the respective detected value exceeds the first predetermined value.

The analog-to-digital converter 130 is generally operational to convert the analog data in the detected signal 143 to generate a digital detected signal 144. The digital detected signal 144 is received by the controller 108 for processing. In various embodiments, the analog-to-digital converter 130 may be one of a stand-alone circuit, part of the detector 104, or part of the controller 108.

The transmitter 132 may be implemented as wired and/or a wireless transmitter. The transmitter 132 is generally operational to transmit the message signal 90 to the external device 88. Transmit data for the transmitter 132 to send in the message signal 90 may be received from the controller 108 via a transmit signal 146. The controller 108 may be configured to transmit the message signal 90 through the transmitter 132 to the external device 88 in response to detection of one or more subjects 84 within the unacceptable proximity range where the respective detected value exceeds the first predetermined value.

The transmitter 132 is generally in communication with the controller 108.

The receiver 134 may be implemented as wired and/or a wireless receiver. The receiver 134 is generally operational to receive the message signal 90 from the external device 88. Receive data in the message signal 90 arriving at the receiver 134 may be transferred to the controller 108 via a receive signal 148. The controller 108 may utilize the receive data to adjust operational parameters of the proximity detection apparatus 100. In various embodiments, the receive data may be used to reprogram software in the memory 142.

The battery 136 may implement a portable battery disposed on the wearable article 102. The battery 136 is generally operational to provide electrical power to the circuitry of the proximity detection apparatus 100. In various embodiments, the battery 136 may implement one or more rechargeable batteries. Recharging may be achieved through the interface connector 138. The charging status may be displayed with visual indicators. In other embodiments, the battery 136 may implement one or more replaceable batteries. A power signal 150 may transfer electrical power from the battery 136 to at least the alert device 106, the controller 108, the analog-to-digital converter 130, the transmitter 132 and the receiver 134. In designs where the detector 104 is an active device (e.g., transmits infrared light to illuminate the subject 84), the power signal 150 may provide electrical power to the detector 104.

The interface connector 138 may implement a wired electrical connector. The electrical connector is an electromechanical device used to join electrical conductors and create an electrical circuit. The interface connector 138 is generally operational to provide communication for the controller 108 from outside the proximity detection apparatus 100 through an internal signal 152. The communication may be used to adjust the operational parameters of the proximity detection apparatus 100. In some embodiments, the communication may be used to reprogram the software stored in the memory 142. If the memory 142 is used to store information concerning the subjects 84 intruding into the unacceptable proximity, the interface connector 138 may be utilized to download the information to another device (e.g., the external device 88). In some designs, the interface connector 138 may be configured to transfer electrical power to the battery 136 for recharging. Where the interface connector 138 is implemented as a Universal Serial Bus (USB), the user 80 is able to plug-in the proximity detection apparatus 100 to a standard 5-volt direct current USB charger in order to recharge the battery 136.

The processor 140 is generally implemented as one or more processors. Each processor may be embodied as a separate processor, an application specific integrated circuit (ASIC), a field programmable gate array (FPGA), a system on chip (SoC), a single board computer (SBC), a dedicated electronic circuit and/or a microcontroller unit (MCU). The processor 140 may include accompanying hardware in the form of a high-speed clock or timer, analog-to-digital and digital-to-analog circuitry, and input/output circuitry and devices, as well as appropriate signal conditioning and buffer circuitry. The processor 140 may communicate with the memory 142 via a memory signal 154. The processor 140 is generally operational to execute software stored in the memory 142 to perform the various functions of the proximity detection apparatus 100.

The processor 140 generally receives the various signals from the detector 104, the receiver 134, and/or a manual input device and determines performance based on rule sets (internal and/or external) and user configuration selections.

The processor 140 subsequently computes the control signal 114 for alert device 106 to adjust parameters of the alert 112 (e.g., intensity, tactile and/or audible).

In various embodiments, the processor 140 may generate the control signal 114 as a pulse-width modulated signal to the alert device 106 to notify the user 80 to subject direction, presence and/or distance. Optionally, the processor 140 store in the memory 142 and/or send performance data and/or detection reports to a management system a connected smart device and/or network server using radio frequency communication of the transmitter 132. The processor 140 may also monitor a charge level of the battery 136. The user 80 is alerted to a low charge state with one or more indicators (e.g., light emitting diodes) and/or a management system.

The memory 142 may include tangible, non-transitory memory, (e.g., read-only memory in the form of optical, magnetic, and/or flash memory) and volatile memory. For example, the memory 142 may include application-suitable amounts of random-access memory, read-only memory, flash memory and other types of electrically-erasable programmable read-only memory. The memory 142 is generally operational to store the software (or computer-readable and executable instructions) executed by the processor 140, input data consumed by the software, and output data generated by the software. The software embodying the present method may be stored in the memory 142 and executed as set forth herein. The executable instructions may be a series of instructions employed to run applications on the processor 140 (either in the foreground or background).

Figures 4, 5:
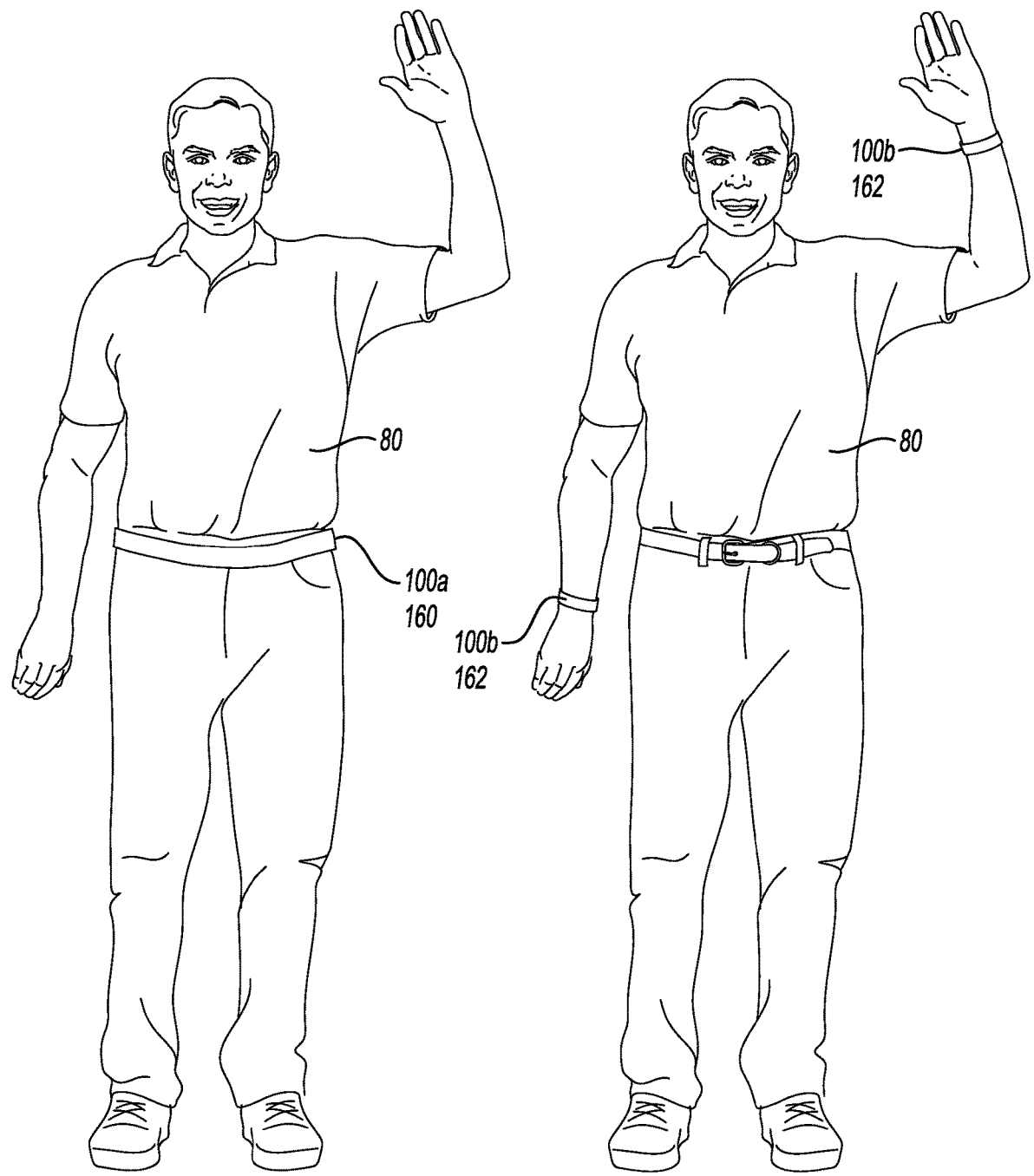
FIG. 4 is a schematic diagram of a proximity detection apparatus in accordance with an exemplary embodiment.
FIG. 5 is a schematic diagram of another proximity detection apparatus in accordance with an exemplary embodiment.

Referring to FIG. 4, a schematic diagram of an example implementation of a proximity detection apparatus 100*a* is shown in accordance with an exemplary embodiment. The proximity detection apparatus 100*a* may be a variation of the proximity detection apparatus 100. In the embodiment illustrated, the wearable article 102 of the proximity detection apparatus 100*a* is implemented as a belt 160. The belt 160 is configured to reside around a waist of the user 80.

Referring to FIG. 5 a schematic diagram of an example implementation of another proximity detection apparatus 100*b* is shown in accordance with an exemplary embodiment. The proximity detection apparatus 100*b* may be a variation of the proximity detection apparatus 100. In the embodiment illustrated, the wearable article 102 of the proximity detection apparatus 100*b* is implemented as one or more bracelets 162. Each bracelet 162 is configured to reside around a respective wrist of the user 80. In various embodiments, the bracelets 162 may be implemented as a waterproof lightweight rubbery band. In some embodiments, each bracelet 162 may be a self-contained proximity detection apparatus 100 giving the user 80 a redundant capability. In other embodiments, each bracelet 162 in a coordinated pair of bracelets may include half of the detectors 104*a*-104*g* and half of the alert devices 106*a*-106*f*, and operate together with a common controller 108 (e.g., a smart phone). Other numbers of wearable articles 102 may be implemented to meet the design criteria of a particular application.

Referring to FIG. 6 a schematic diagram of an example implementation of still another proximity detection apparatus 100*c* is shown in accordance with an exemplary embodiment. The proximity detection apparatus 100*c* may be a variation of the proximity detection apparatus 100. In the embodiment illustrated, the wearable article 102 of the proximity detection apparatus 100*c* is implemented as eyeglasses 164. The eyeglasses 164 may include smart glasses. For example, the eyeglasses 164 may be Google Glass' (trademark of Google LLC, Mountain View, Calif.). In another example, the proximity detection apparatus 100*c* may be attached to a frame of safety glasses. Other smart glasses may be implemented to meet the design criteria of a particular application.

Referring to FIG. 7 a schematic diagram of an example implementation of yet another proximity detection apparatus 100*d* is shown in accordance with an exemplary embodiment. The proximity detection apparatus 100*d* may be a variation of the proximity detection apparatus 100. In the embodiment illustrated, the wearable article 102 of the proximity detection apparatus 100*d* is implemented as a hat 166. The hat 166 is configured to worn on a head of the user 80. In some embodiments, the hat 166 may be a bump camp. In other embodiments, the wearable article 102 may also be a necklace, an anklet, a glove, a shoe attachment, a leg band, a clip or an arm band. Where implemented as a clip, the wearable article 102 could be attached to a belt, a tie, a lapel, a phone case, a hat, and so on, such that the fields of view 120*a*-120*g* of the detectors 104*a*-104*g* are unobstructed. In various embodiments, the proximity detection apparatus 100 may be embedded in other garments and/or accessories. In some designs, the proximity detection apparatus 100 may be built into universal interfaces for various garments and/or accessories.

Figure 8:
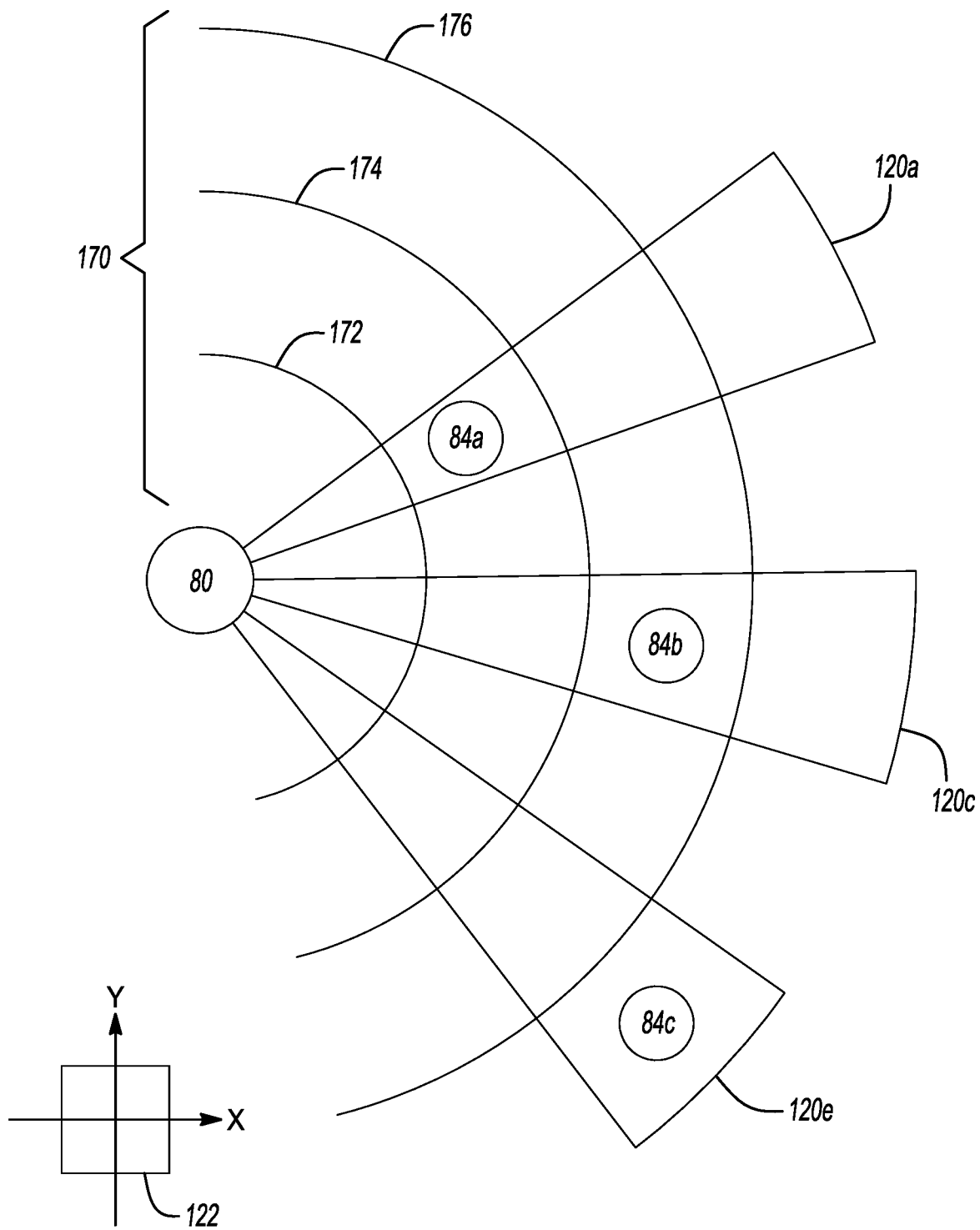
FIG. 8 is a schematic plan diagram of multiple subject in proximity to a user shown in accordance with an exemplary embodiment.

Referring to FIG. 8, a schematic plan diagram of an example situation of multiple subjects 84 in proximity to the user 80 is shown in accordance with an exemplary embodiment. A vicinity 170 may be defined around the user 80. The vicinity 170 may encompass multiple ranges. In the example, the vicinity 170 around the user 80 includes a near proximity range 172, an intermediate proximity range 174, and an unacceptable proximity range 176. In some embodiments, the vicinity 170 may be limited to the unacceptable proximity range 176.

In the example, a near subject 84*a* may be located between the near proximity range 172 and the intermediate proximity range 174 within the field of view 120*a*. An intermediate subject 84*b* may be located between the intermediate proximity range 174 and the unacceptable proximity range 176 within the field of view 120*c*. A distant subject 84*c* may be located slightly beyond the unacceptable proximity range 176 within the field of view 120*e*.

In operation, the proximity detection apparatus 100 may detect the individual subjects 84*a*, 84*b* and 84*c*. Since both the near subject 84*a* and the intermediate subject 84*b* are intruding into the unacceptable proximity range 176, the proximity detection apparatus 100 may assert one or more alerts 112 to inform the user 80 that the subjects 84*a* and 84*b* are nearby. Since the distant subject 84*c* is outside the unacceptable proximity range 176, the proximity detection apparatus 100 generally does not alert the user 80 to the distant subject 84*c*, even though the distant subject 84*c* is sufficiently close to be detected by the proximity detection apparatus 100.

Figure 9:
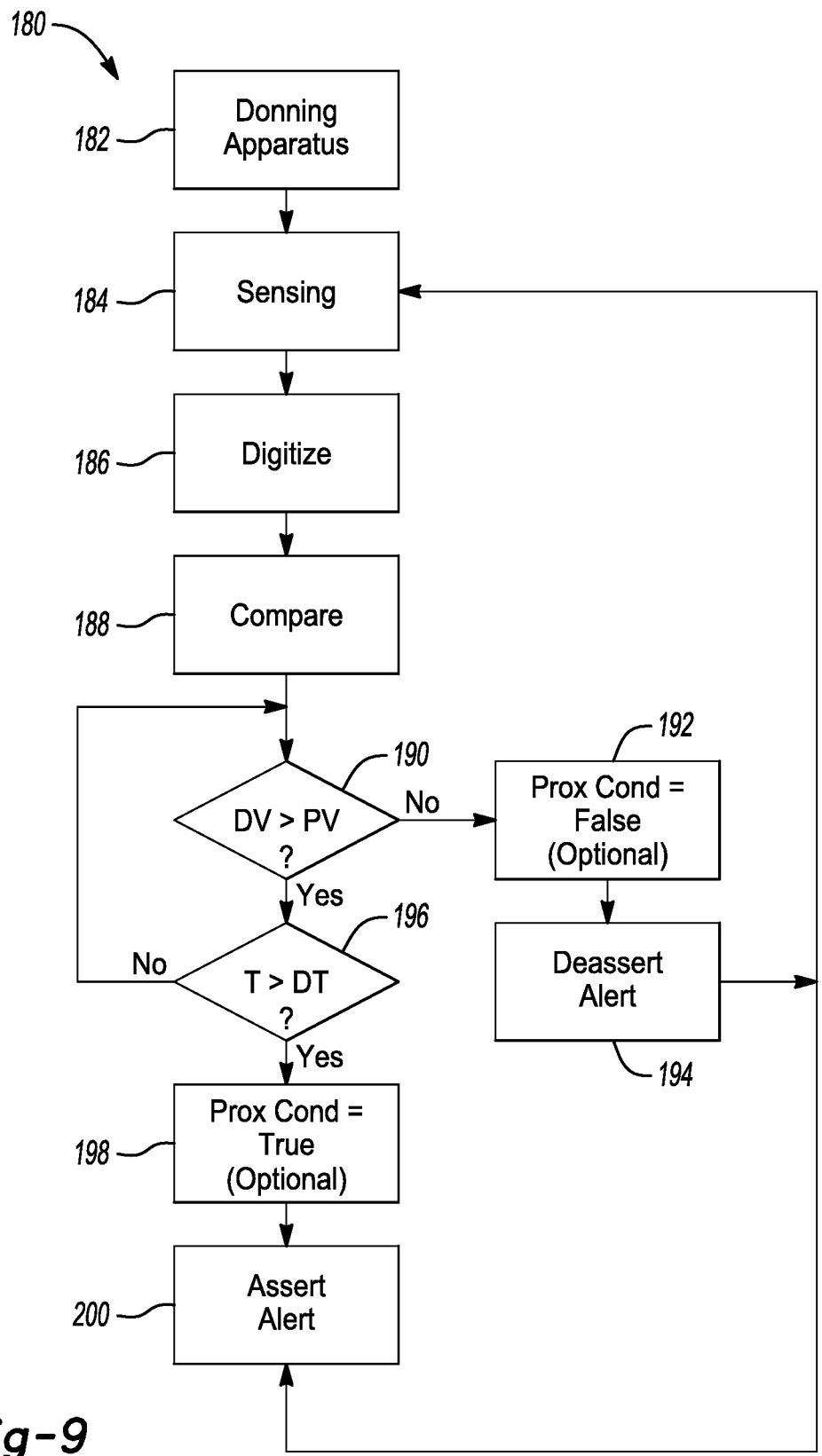
FIG. 9 is a flow diagram of a method of operation in accordance with an exemplary embodiment.

Referring to FIG. 9, a flow diagram of an example method of operation 180 is shown in accordance with an exemplary embodiment. The method (or process) of operation 180 may be implemented by the proximity detection apparatus 100. The method of operation 180 generally includes a step 182, a step 184, a step 186, a step 188, a step 190, a step 192, a step 194, a step 196, a step 198, and a step 200. The sequence of steps is shown as a representative example. Other step orders may be implemented to meet the criteria of a particular application.

In the step 182, the user 80 may don the proximity detection apparatus 100 and switch on the power. After an initialization, the detectors 104*a*-104*g* may begin sensing the incident infrared radiation 82 in the vicinity 170 in the step 184. The analog-to-digital converter 130 may convert the analog data in the detected signal 143 into digital data in the digital detected signal 144 in the step 186. The digital detected signal 144 is subsequently transferred to the controller 108.

In the step 188, the controller 108 compares the detected value conveyed by the digital detected signal 144 to determine when the detected value exceeds the first predetermined value. The first predetermined value may be set in the controller 108 and is associated with a proximity condition of the unacceptable proximity range 176 relative to the subject 84. If the step 190 determines that the detected value (DV) does not exceed the first predetermined value (PV), the method 180 may continue with the step 192. The controller 108 may set the proximity condition to false (e.g., no subjects 84 are in the unacceptable proximity range 176 in the step 192. The controller 108 subsequently generates the control signal 114 in the step 194 to command the alert device 106 to deassert (or suppress) the alert 112. The method 180 may return to the step 184 to continue sensing the infrared radiation 82 in the vicinity 170.

If the step 190 determines that the detected value exceeds the first predetermined value, the controller 108 may wait for a dwell time (DT) in the step 196. During the dwell time, the method 180 may repeatedly check the detected value in the step 190. If the detected value remains above the first predetermined value for the dwell time, the controller 108 sets the proximity condition to true (e.g., at least one subject 84 is detected in the unacceptable proximity range 176 in the step 198. In the step 200, the controller 108 generates the control signal 114 to command the alert device 106 to assert the alert 112. The method 180 may return to the step 184 to continue sensing the infrared radiation 82 in the vicinity 170.

Figure 10:
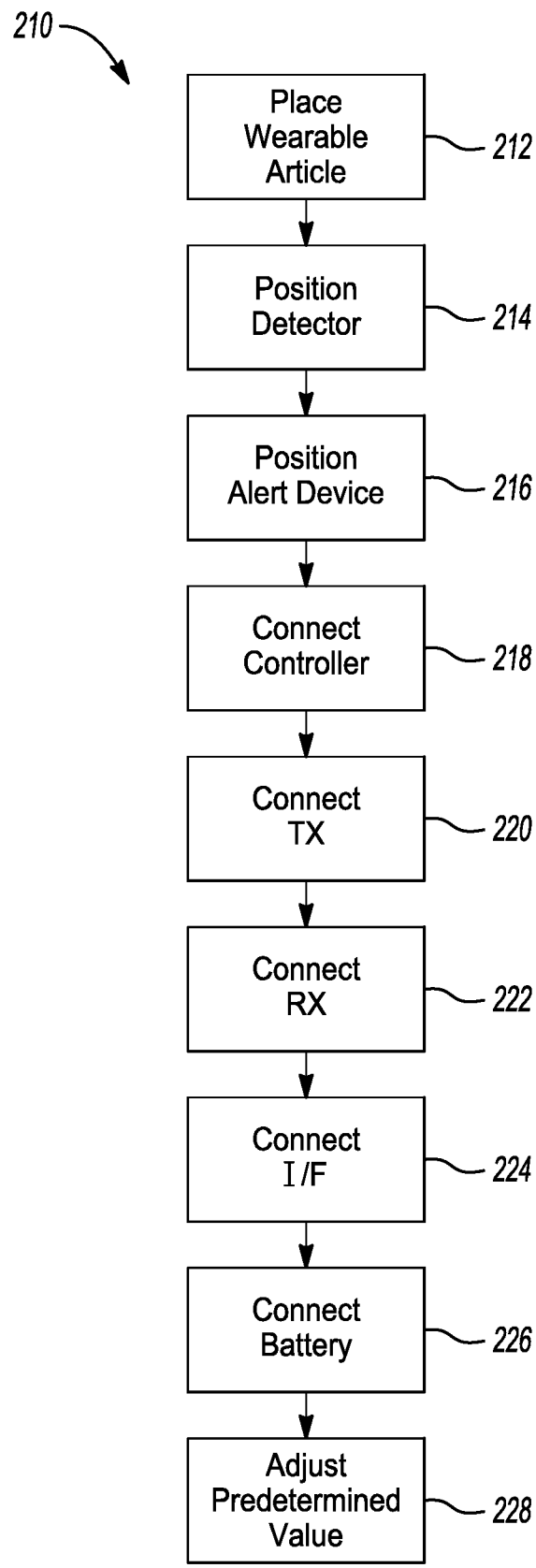
FIG. 10 is a flow diagram of a method for fabricating the proximity detection apparatus in accordance with an exemplary embodiment.

Referring to FIG. 10, a flow diagram of an example method for fabricating 210 the proximity detection apparatus 100 is shown in accordance with an exemplary embodiment. The method (or process) for fabrication 210 may include a step 212, a step 214, a step 216, a step 218, a step 220, a step 222, a step 224, a step 226, and a step 228. The sequence of steps is shown as a representative example. Other step orders may be implemented to meet the criteria of a particular application.

In the step 212, the wearable article 102 is placed in a support structure to maintain a controlled orientation. The detector 104 is positioned on a wearable article 102 in the step 214. The detector 104 is configured to generate the detected value by sensing the infrared radiation 82 emitted from the subject 84 in the vicinity 170 of the wearable article 102. The wearable article 102 is configured to be carried (e.g., worn or supported) by the user 80.

In the step 216, the alert device 106 is positioned on the wearable article 102. The alert device 106 is configured to generate the alert 112 in response to the control signal 114. The controller 108 is connected to the detector 104 and the alert device 106 on the wearable article 102. In the step 218, the controller 108 is configured to set the first predetermined value associated with the proximity condition (step 198) of the unacceptable proximity range 176, determine when the detected value exceeds the first predetermined value, and generate the control signal 114 to command the alert device 106 to present the alert 112 to inform the user 80 that the subject 84 is detected within the unacceptable proximity range 176.

In the step 220, the transmitter 132 is connected to the controller 108. The receiver 134 is connected to the controller 108 in the step 222. The interface connector 138 is connected in the step 224 and the battery 136 is connected in the step 226. In the step 228, the configuration signal 92, the message signal 90, or a manual control of the proximity detection apparatus 100 is used to adjust the first predetermined value to obtain the intended unacceptable proximity range 176. Adjusting the setting of the first predetermined value associated with the proximity condition 198 of the unacceptable proximity range 176 to a select value may adjust a distance of the unacceptable proximity range 176 in which the subject 84 may intrude.

Figure 11:
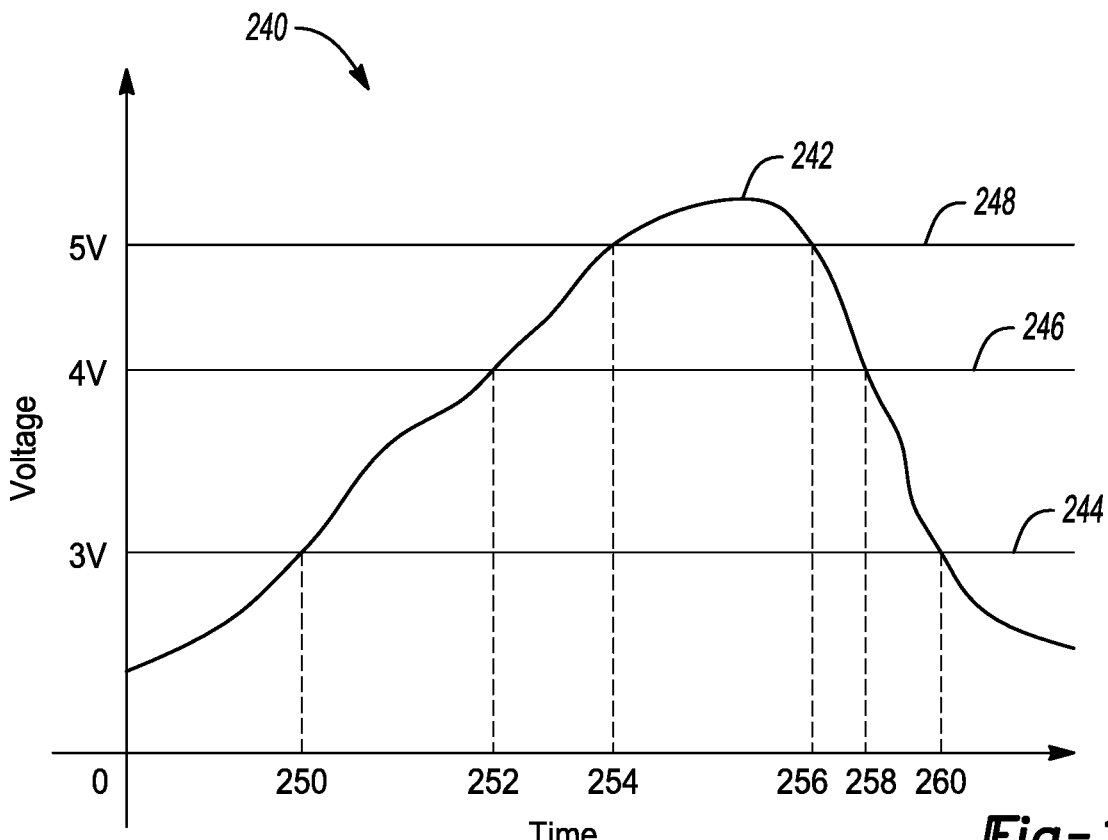
FIG. 11 is a graph of detected infrared radiation over time in accordance with an exemplary embodiment.

Referring to FIG. 11, a graph 240 of example detected infrared radiation over time is shown in accordance with an exemplary embodiment. An x-axis of the graph 240 may be in units of time (e.g., seconds). A y-axis of the graph 240 may be in units of volts.

A voltage representing the detected value 242 carried by the detected signal 143 may increase as the subject 84 approaches the user 80. The detected value 242 may exceed the first predetermined value 244 (e.g., a select voltage threshold=3 volts) at a time 250 (e.g., when the subject 84 initially enters the unacceptable proximity range 176.

At a time 252, the detected value 242 may exceed a second predetermined value 246 (e.g., approximately 4 volts). If a first duration between the time 250 and the time 252 is less than a first dwell time (e.g., approximately 5 to approximately 10 seconds), the controller 108 may suppress assertion of the alert 112 even though the subject 84 is inside the unacceptable proximity range 176. If the first duration is longer that the first dwell time, the controller 108 may cause the alert 112 to be asserted. The suppression of the alert 112 generally allows the subject 84 to pass by the user 80 within a limited amount of time without triggering the alert 112.

At a time 254, the detected value 242 may exceed a third predetermined value 248 (e.g., approximately 5 volts). If a second duration between the time 252 and the time 254 is less than a second dwell time (e.g., 1 to 5 seconds), the controller 108 may suppress assertion of the alert 112. If the second duration is longer than the second dwell time, the controller 108 may activate the alert 112. The second dwell time may be shorter than the first dwell time because the subject 84 is closer to the user 80.

At a time 256, the detected value 242 may fall below the third predetermined value 248. If a third duration between the time 254 and the time 256 is less than a third dwell time (e.g., 0 to approximately 1 second), the controller 108 may suppress assertion of the alert 112. If the third duration is longer that the third dwell time, the controller 108 may cause the alert 112 to be asserted. The third dwell time may be shorter than the first dwell time and the second dwell time because the subject 84 is even closer to the user 80. In some embodiments, the third dwell time may be zero seconds to provide an instant alert 112. In other embodiments, the third dwell time may be short to filter stray bursts of the infrared radiation 82 from triggering a false alert 112.

As the subject 84 moves past and then away from the user 80, the detected value 242 may continue to fall. The falling detected value 242 may go below the second predetermined value 246 at a time 258 and go below the first predetermined value 244 at a time 260. Between the time 256 and the time 258, the second dwell time is applied. Between the time 258 and 260, the first dwell time is applied. While the detected value 242 is below the first predetermined value 244, the controller 108 does not activate the alert 112.

Where the subject 84 remains in the unacceptable proximity range 176 for longer than the dwell times, the alert 112 may remain active during the duration that the detected value 242 exceeds the first predetermined value 244 for determining that the subject 84 is within the unacceptable proximity range 176. The subject 84 in the vicinity 170 may expose the user 80 to the contaminant and/or an airborne infectious agent 86 coming from the subject 84.

Figure 12:
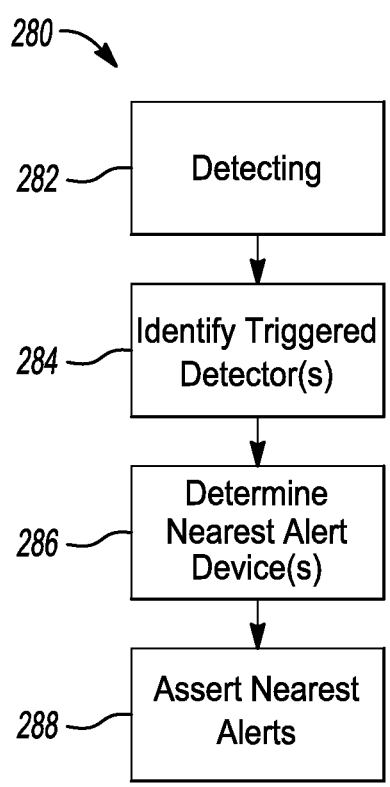
FIG. 12 is a flow diagram of a method for determining direction in accordance with an exemplary embodiment.

Referring to FIG. 12, a flow diagram of an example method for determining direction 280 is shown in accordance with an exemplary embodiment. The method (or process) for determining direction 280 is implemented by the proximity detection apparatus 100. The method for determining direction 280 generally includes a step 282, a step 284, a step 286, and a step 288. The sequence of steps is shown as a representative example. Other step orders may be implemented to meet the criteria of a particular application.

In the step 282, the proximity detection apparatus 100 may be detecting in the infrared radiation 82 incident on the detectors 104a-104g. The controller 108 may identify in the step 284 which of the corresponding detectors 104a-104g are considered triggered because the corresponding detected values 242 exceed the first predetermined value 244. Based on the detectors 104a-104g that are considered triggered, the controller 108 may determine one or two nearest alert devices 106a-106f that are spatially aligned with, or at least spatially close to, the triggered detectors 104a-104g in the step 286. Knowing which alert devices 106a-106f have been determined as triggered, the controller 108 may cause those alert devices 106a-106f to assert the corresponding alerts 112 in the step 288 to inform the user 80 an approximate direction of each subject 84 within the unacceptable proximity range 176.

Figure 13:
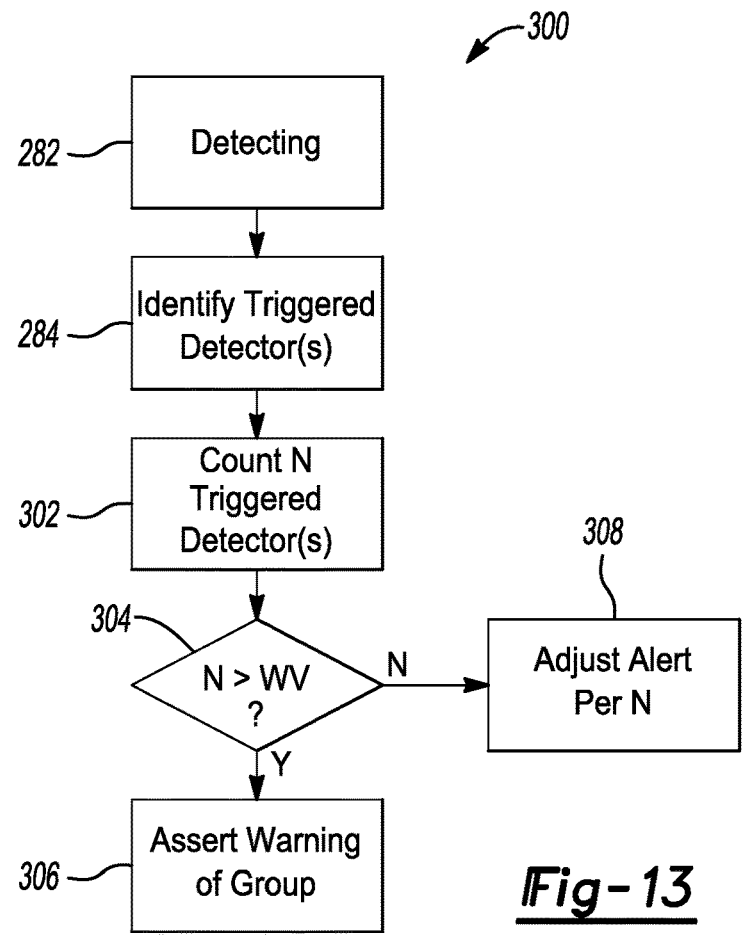
FIG. 13 is a flow diagram of a method for detecting a group in accordance with an exemplary embodiment.

Referring to FIG. 13, a flow diagram of an example method for detecting a group 300 is shown in accordance with an exemplary embodiment. The method (or process) for detecting the group 300 may be implemented by the proximity detection apparatus 100. The method for detecting the group 300 generally includes the step 282, the step 284, a step 302, a step 304, a step 306, and a step 308. The sequence of steps is shown as a representative example. Other step orders may be implemented to meet the criteria of a particular application.

In the step 282, the proximity detection apparatus 100 may detect the infrared radiation 82 incident on the detectors 104a-104g. The controller 108 may identify in the step 284 which of the corresponding detectors 104a-104g are considered triggered because the corresponding detected values 242 exceed the first predetermined value 244.

In the step 302, the controller 108 may count a number (N) of the detected values 242 that exceed the first predetermined value 244. A check is performed in the step 304 to compare the number N with a warning value (WV). The controller 108 is configured to generate the control signal 114 to command the alert device 106 to present the alert 112, including a warning, to the user 80 in the step 306 while the number N of the proximity conditions 198 that are true exceeds the warning value WV. The alert/warning 112 generally informs the user 80 that a group of the subjects 84 are nearby. If the number N does not exceed the warning value WV, the controller 108 may generate the control signal 114 to adjust the alert 112 based on the number N in the step 308 (e.g., increase the amplitude of the alert 112 as the number N increases).

Figure 14:
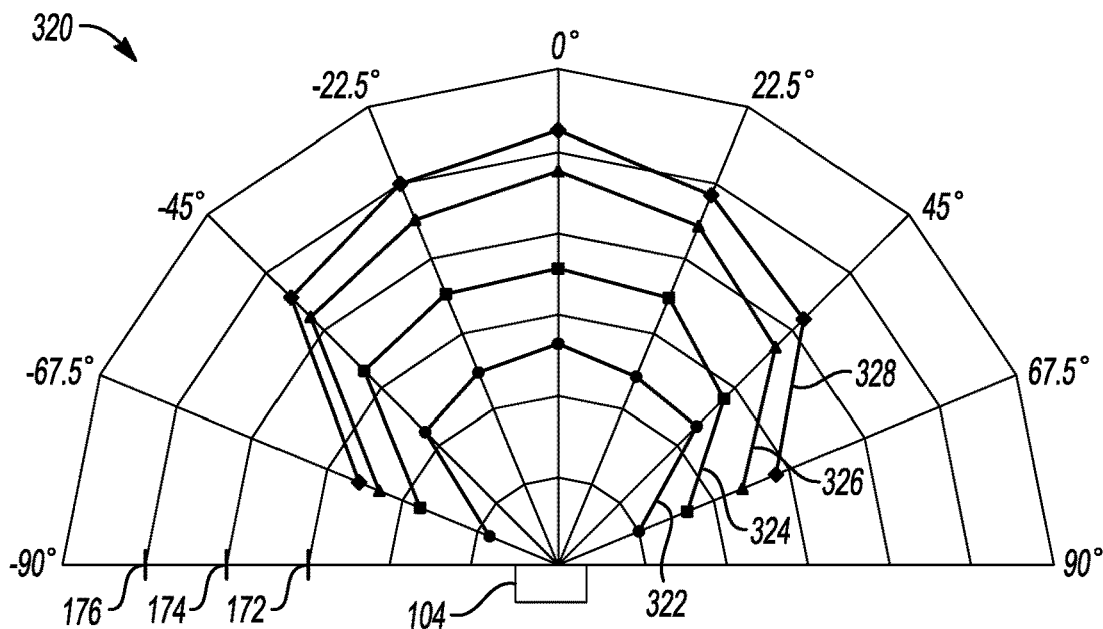
FIG. 14 is a graph of thermal sensitivity of a detector in accordance with an exemplary embodiment.

Referring to FIG. 14, a graph 320 of an example thermal sensitivity of the detector 104 is shown in accordance with an exemplary embodiment. The detector 104 may have a symmetrical sensitivity about a normal line to a face of the detector 104. In the example, the detector 104 may have a field of view of approximately 135 degrees (e.g., ±67.5 degrees). Other fields of view may be implemented to meet a design criteria of a particular application.

The graph 320 generally includes a near arc at the near proximity range 172 from the detector 104. An intermediate arc is shown at the intermediate proximity range 174. A distant arc is shown at the unacceptable proximity range 176.

A first curve 322 generally illustrates a first distance to the subject 84 that results in the detected value 242 while the subject 84 is a few degrees (e.g., 5 degrees) warmer than an ambient background temperature. A second curve 324 generally illustrates a second distance to the subject 84 that results in the detected value 242 while the subject 84 is a few more degrees (e.g., 10 degrees) warmer than the ambient background temperature. A third curve 326 generally illustrates a third distance to the subject 84 that results in the detected value 242 while the subject 84 is warmer degrees (e.g., 20 degrees) than the ambient background temperature. A fourth curve 328 generally illustrates a fourth distance to the subject 84 that results in the detected value 242 while the subject 84 is even warmer degrees (e.g., 25 degrees) than the ambient background temperature. The graph 320 generally shows that the subject 84 should be heated to a temperature above ambient in order to be recognized by the proximity detection apparatus 100.

Figure 15:
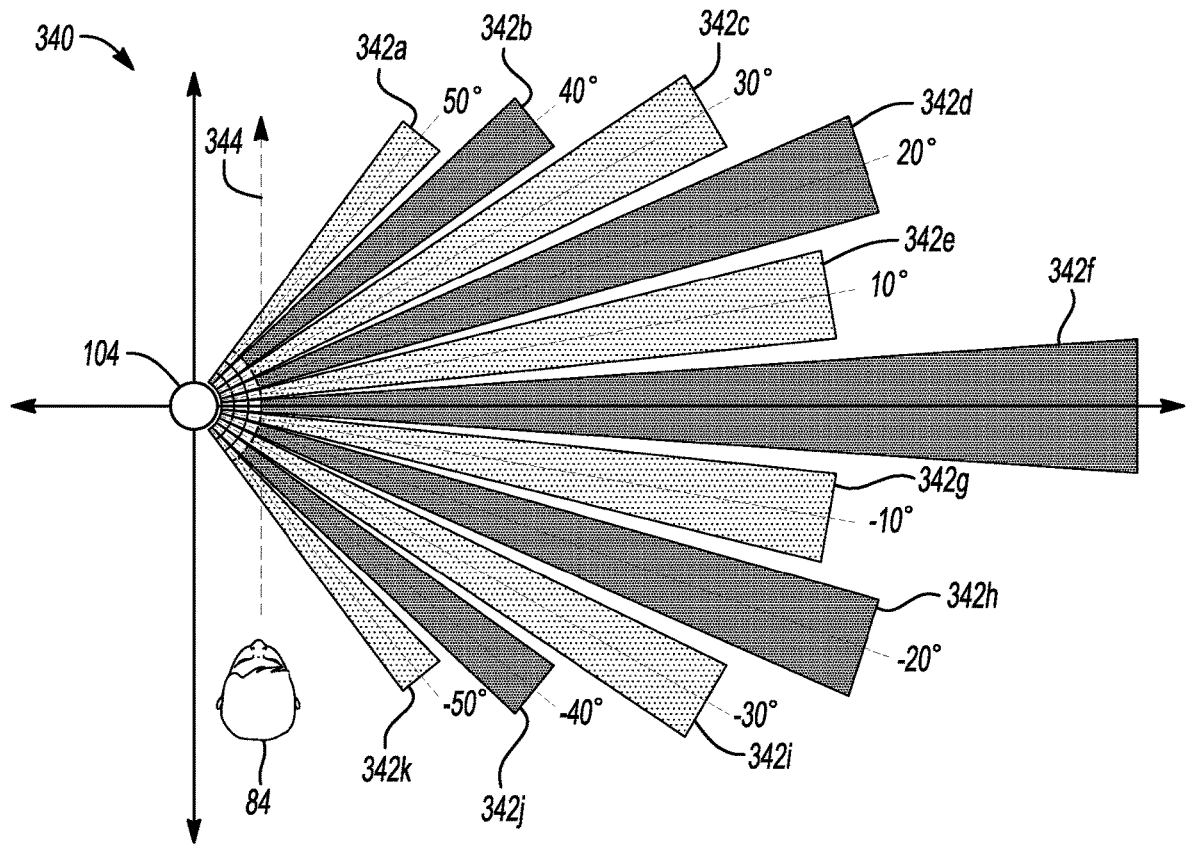
FIG. 15 is a graph of spatial sensitivity of the detector in accordance with an exemplary embodiment.

Referring to FIG. 15, a graph 340 of an example spatial sensitivity of the detector 104 is shown in accordance with an exemplary embodiment. The detector 104 may be implemented as a passive infrared (PIR) detector with a Fresnel lens. The detector 104 has multiple passive sensors. Each passive sensor is pointed in an individual direction and has a respective field of view 342a-342k. The neighboring fields of view 342a-342k do not overlap.

As the subject 84 moves along a path 344, the subject 84 enters and exits each field of view 342a-342k sequentially. The infrared radiation 82 from the subject 84 may be sensed by the passive sensors to generate a series of pulses in the detected signal 143 as the subject 84 moves through the fields of view 342a-342k.

Figure 16:
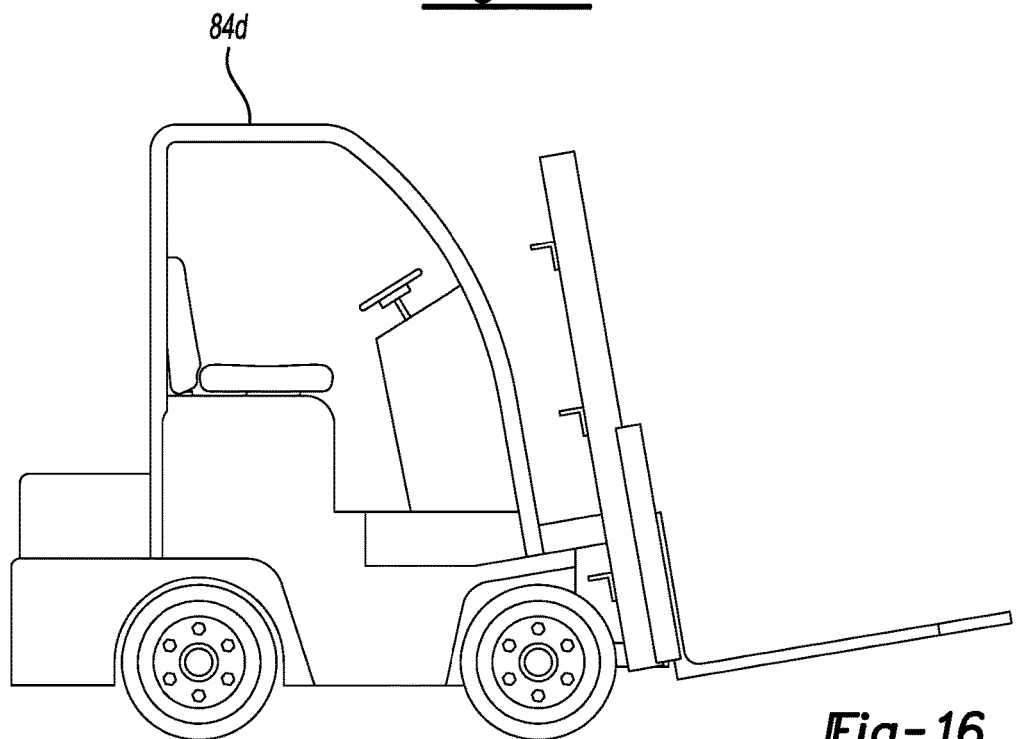
FIG. 16 is a schematic diagram of a subject in accordance with an exemplary embodiment.

Referring to FIG. 16, a schematic diagram of an example subject 84d is shown in accordance with an exemplary embodiment. The subject 84d may be a variation of the subject 84. In various embodiments, the subject 84d is implemented as a vehicle. For example, the subject 84d may be a forklift. Other vehicles that are commonly around the user 80 may also be considered subjects 84.

Where the detector 104 is a passive infrared sensor, the detector 104 may generate a detected voltage value that increases due to an increase in the infrared radiation 82 as the subject 84 comes closer to the detector 104. In such an embodiment, the controller 108 is configured to adjustably set the first predetermined value associated with the proximity condition 198 of the unacceptable proximity range 176 to a select voltage threshold, and adjust a distance of the unacceptable proximity range 176 in determining when the detected voltage value (e.g., the detected value 242) resulting from the infrared radiation 82 exceeds the select voltage threshold.

Referring to FIG. 17, a schematic diagram of an example subject 84e is shown in accordance with an exemplary embodiment. The subject 84e may be a variation of the subject 84. In some embodiments, the subject 84e is implemented as a robotic device. Other robotic devices that are commonly around the user 80 may also be considered subjects 84.

Referring to FIG. 18, a schematic diagram of an example alert device 106a is shown in accordance with an exemplary embodiment. The alert device 106*a* may be a variation of the alert device 106. In various embodiments, the alert device 106*a* may be implemented as a speaker. The alert 112*a* generated by the speaker may be an audio sound.

Referring to FIG. 19, a schematic diagram of an example alert device 106*b* is shown in accordance with an exemplary embodiment. The alert device 106*b* may be a variation of the alert device 106. In various embodiments, the alert device 106*b* may be implemented as a tactile device. The alert 112*b* generated by the tactile device may be physical vibration.

Referring to FIG. 20, a schematic diagram of an example alert device 106*c* is shown in accordance with an exemplary embodiment. The alert device 106*c* may be a variation of the alert device 106. In various embodiments, the alert device 106*c* may be implemented as a visual device (e.g., a display). The alert 112*c* generated by the visual device may be a two-dimensional image.

Figure 21:
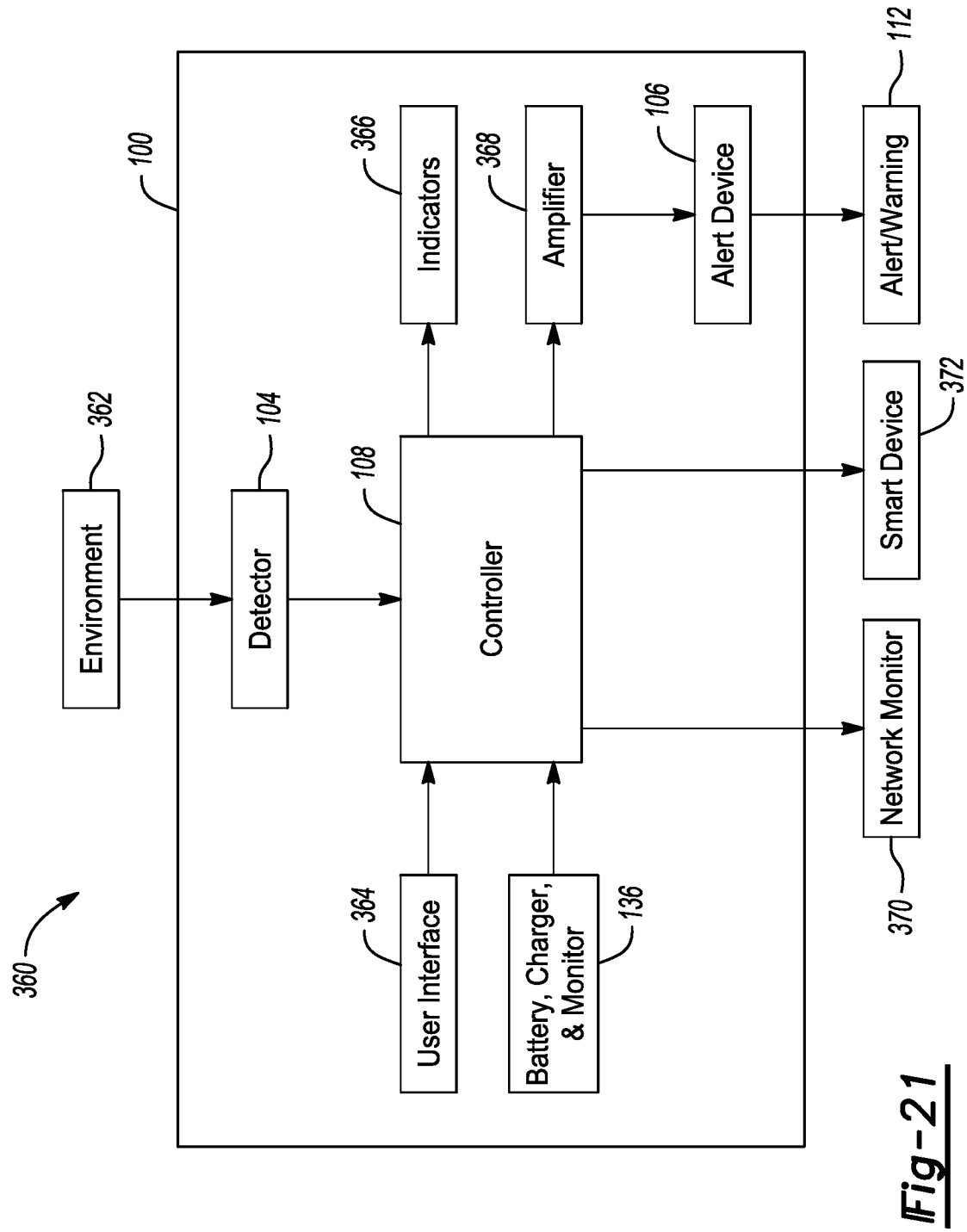
FIG. 21 is a schematic block diagram of a device architecture in accordance with an exemplary embodiment.

Referring to FIG. 21, a schematic block diagram on an example device architecture 360 is shown in accordance with an exemplary embodiment. The device architecture 360 generally includes the detector 104, the alert device 106, the controller 108, the battery 136, an environment 362, a user interface 364, indicators 366, an amplifier 368, a network monitor 370, and a smart device 372.

The environment 362 may include an area where the user 80 and the subject 84 are commonly located. The environment 362 may be a facility where the user 80 works, a public area, a home of the user 80, and the like. The environment 362 may provide opportunities for one or more subjects 84 to come into the vicinity 170 of the user 80.

The user interface 364 may implement one or more buttons, one or more dials, one or more switches or any combination thereof. The user interface 364 is generally operational to receive manual inputs from the user 80 and present the manual inputs to the controller 108. In some embodiments, the manual inputs may include an adjustment for the first predetermined value 244 to enable manual changes to how close the subject 84 can get until the alert 112 is asserted. The ability to set the acceptable range may be set by the individual user (and the function may also be overridden) or the acceptable range may be set to groups of devices, such as when different states have different social distancing guidelines or when guidelines are loosened the updates may be applied to the devices for a whole site, for example, in the event of increasing or decreasing social distancing guidelines.

The indicators 366 may implement one or more individual indicators (e.g., light-emitting diodes) and/or one or more visual displays. The indicators 366 are generally operational to present visual information to the user 80. Control of the visual information is provided by the controller 108.

The amplifier 368 may implement one or more transistors. The amplifier 368 is generally operational to amplify control information generated by the controller 108 to a power level in the control signal 114 that can drive the alert device 106. In some embodiments, the control information received by the amplifier may include pulse width modulation information that adjusts a perceived amplitude of the alert 112. Other types of information may be presented from the controller 108 to the amplifier 368 to meet the design criteria of a particular application.

The network monitor 370 may implement a server-based monitor. The network monitor 370 is generally operational to receive the message signal 90 from the proximity detection apparatus 100. The network monitor 370 may be located remote from the proximity detection apparatus 100. Communication between the network monitor 370 and the proximity detection apparatus 100 is a wireless (e.g., radio frequency) communication channel. In some designs, the network monitor 370 may also be operational to receive manual inputs from the user 80 and/or the subjects 84 and transmit the manual input information to the proximity detection apparatus 100.

The smart device 372 may implement a smart watch, a smart phone, a notepad, a personal digital assistant or similar hand-held devices. The smart device 372 is generally operational to send and receive information with the proximity detection apparatus 100. A screen of the smart device 372 may be operational to visually display information from the proximity detection apparatus 100 to the user 80. The displayed information may include the alerts 112 and the warnings. Communication between the smart device 372 and the proximity detection apparatus 100 is the wireless communication channel.

Figure 22:
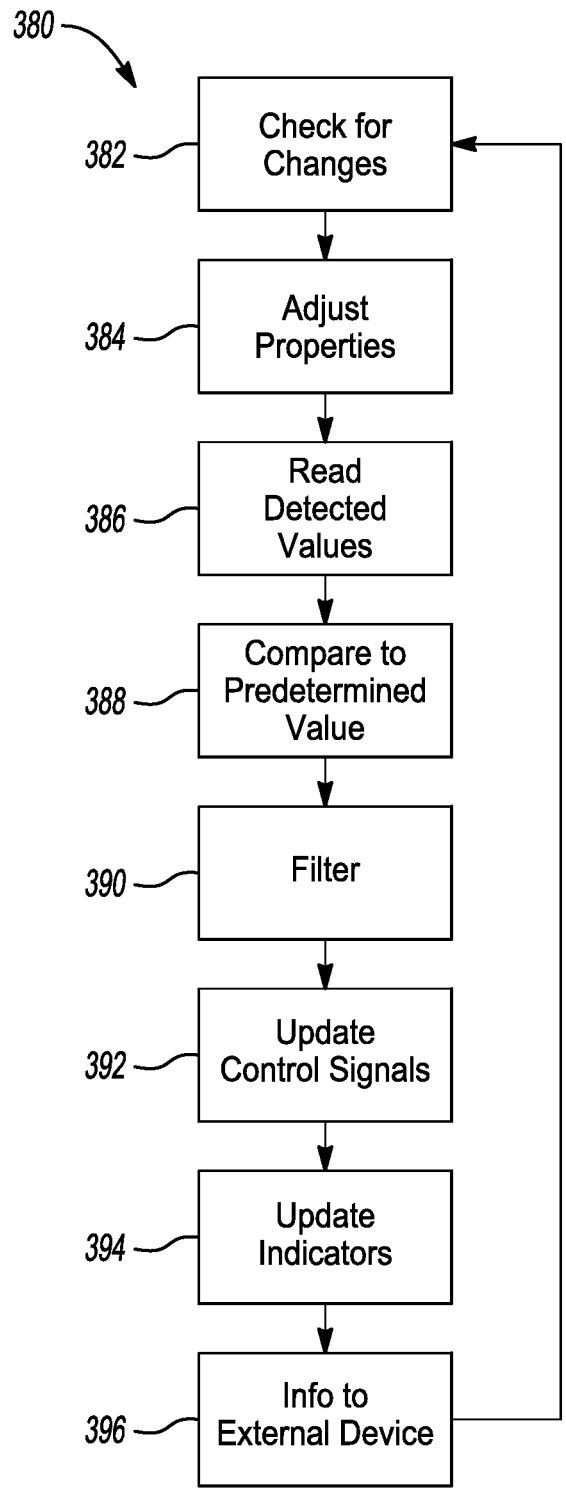
FIG. 22 is a flow diagram of a method of operation in the processor in accordance with an exemplary embodiment.

Referring to FIG. 22, a flow diagram of an example method of operation 380 in the processor 140 is shown in accordance with an exemplary embodiment. The method (or process) of operation 380 may be implemented by software stored in the non-transitory portion of the memory 142 and executed in the processor 140. The method of operation 380 includes a step 382, a step 384, a step 386, a step 388, a step 390, a step 392, a step 394, and a step 396. The sequence of steps is shown as a representative example. Other step orders may be implemented to meet the criteria of a particular application.

In the step 382, the software may configure the processor 140 to check for changes to the user settings and new data received from connected electronic devices (e.g., the external device 88). Updates to the properties used to determine detection states, alert intensity, alert types, dwell time, other filtering parameters, reporting messages, and the like, may be accomplished in the step 384 in response to the changes in the user settings and the newly received data.

In the step 386, the detected values 242 conveyed in the digital detected signals 144 are read into the processor 140. The detected values 242 are compared to the first predetermined value 244 in the step 388 to decide if one or more subjects 84 are within the unacceptable proximity range 176. Comparisons of the detected values 242 to additional predetermined values (e.g., the second predetermined value 246 and the third predetermined value 248) may also be performed in the step 388. Filtering of the detected subjects may be performed in the step 390. The filtering may include, but is not limited to, determining directions of those subjects 84 that are detected in the unacceptable proximity range 176, estimation of the number of such subjects 84, estimations of distances from the user 80 to the subjects 84, calculations of how much time the subjects 84 have been in inside the various ranges, if those times exceed corresponding dwell time limits, and the like.

In the step 392, the commands in the control signals 114 may be updated and presented to the alert devices 104 based on the filtered data. Commands to the indicators 366 may be updated in the step 394 based on the filtered data and subsequently transferred to the indicators 366. Where implemented, the messages to the external device 88 may also be prepared based on the filtered data and transmitted in the step 396 to report the current status of the user 80 and the proximity detection apparatus 100. The method 380 may return to the step 382 and iterate through the steps again.

Figure 23:
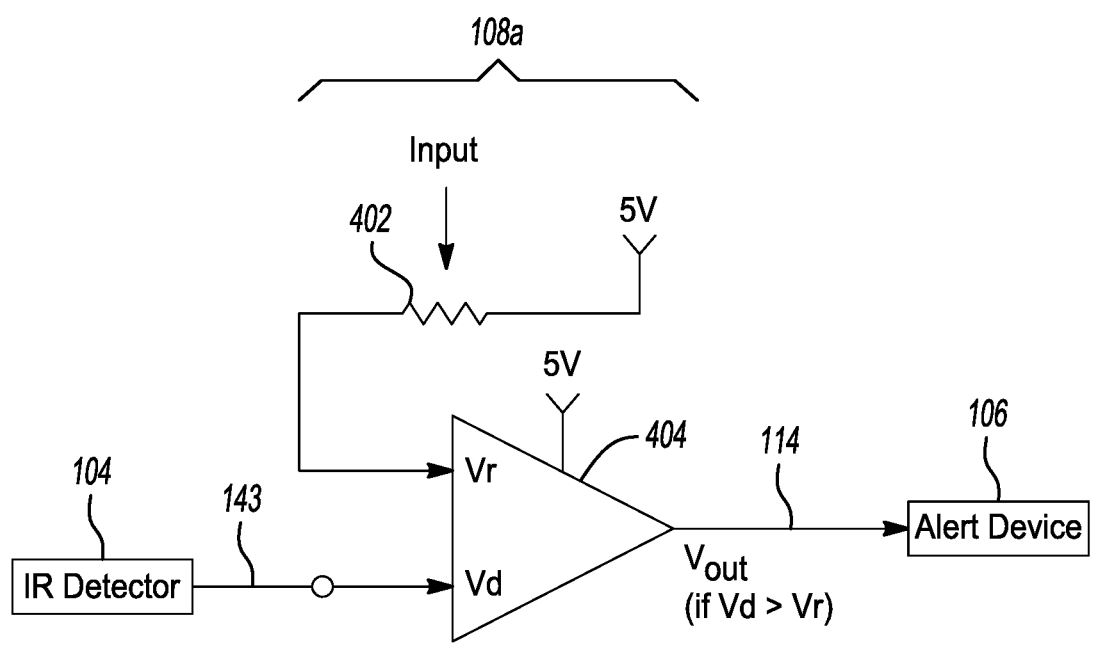
FIG. 23 is a schematic block diagram of an implementation of another controller in accordance with an exemplary embodiment.

Referring to FIG. 23, a schematic block diagram of an example implementation of another controller 108*a* is shown in accordance with an exemplary embodiment. The controller 108a may be a variation of the controller 108. The controller 108a may be implemented solely in analog hardware.

The controller 108a includes a variable resistor 402 and a comparator 404. The variable resistor may be electrically connected between a reference voltage (e.g., 5 volts) and a reference input node (e.g., Vr) of the comparator 404. The detected signal 143 may be received directly at a detector input node (e.g., Vd) of the comparator 404 (e.g., the analog-to-digital converter 130 is not implemented).

The variable resistor 402 is controlled by an input voltage (e.g., Input). In various embodiments, the input voltage Input may be received from the user interface 364. The input voltage Input may be varied by the user 80 to adjust the voltage at the reference input node Vr over a range of voltages (e.g., 0 volts to 5 volts).

The comparator 404 is generally operational to generate an output voltage (e.g., Vout) in the control signal 114 based on a comparison of the voltage at the reference input node Vr and the voltage at the detector input node Vd. The output voltage Vout may be high (e.g., 5 volts) if Vd>Vr. Otherwise, the output voltage Vout may be low (e.g., 0 volts).

Figure 24:
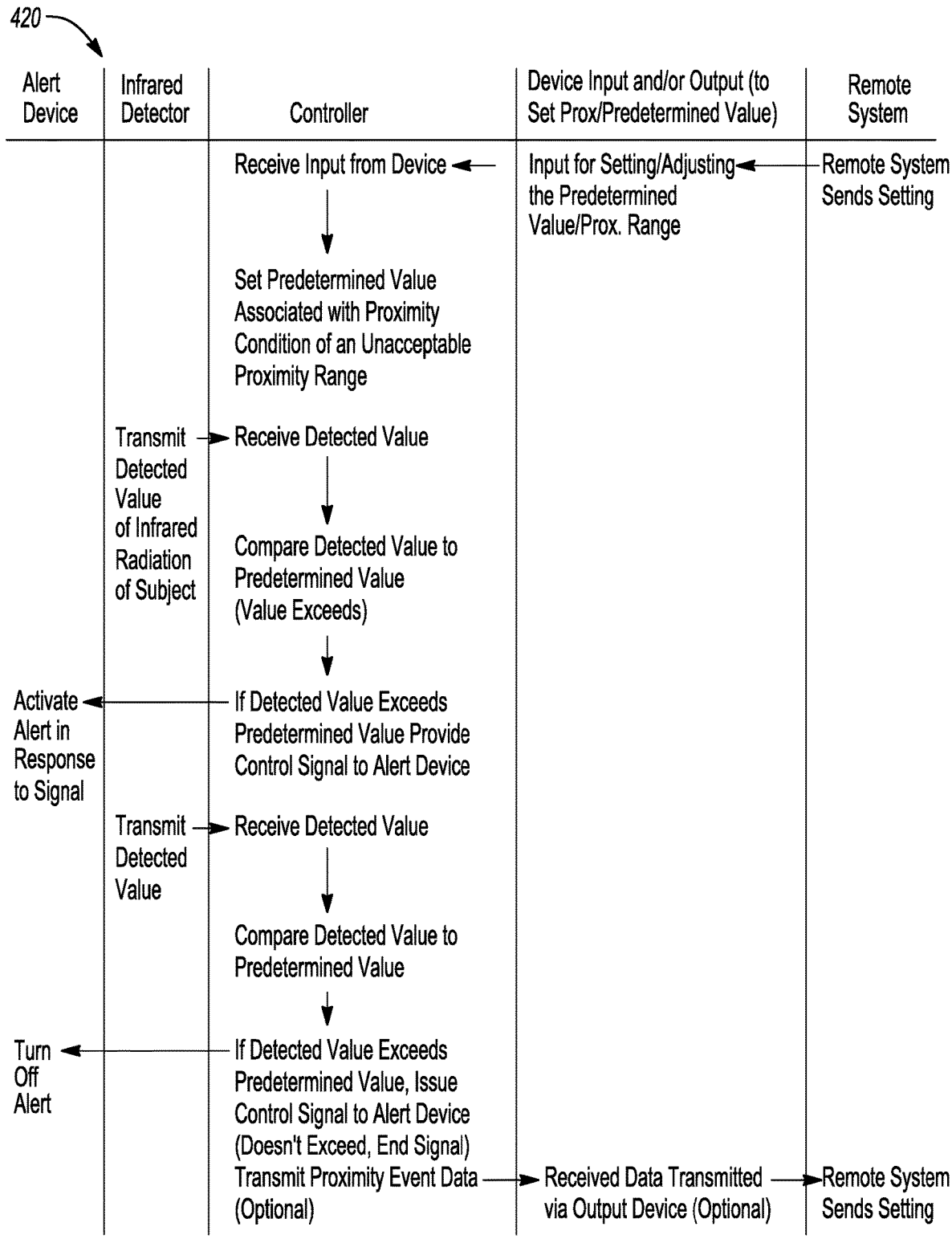
FIG. 24 is a flow diagram of a method of operation of the system in accordance with an exemplary embodiment.

Referring to FIG. 24, a flow diagram of an example method of operation 420 of the system 70 is shown in accordance with an exemplary embodiment. The method (or process) of operation 420 is implemented by at least the proximity detection apparatus 100 and the external device 88 acting as a remote system.

The remote system (e.g., the external device 88 and/or the network monitor 370) may send setting to the proximity detection apparatus 100 (e.g., the receiver 134) for setting proximity values and/or the predetermined values 244-248. The setting may be transferred to the controller 108. The controller 108 generally uses the settings to set the predetermined values associated with the proximity condition of the unacceptable proximity range.

The detectors 104a-104g may transmit the detected values 242 of the infrared radiation 82 received from the subjects 84 to the controller 108. Upon receipt of the detected values 242, the controller may compare the detected values 242 to one or more of the predetermined values 244-248. If any of the detected values 242 exceeds a corresponding predetermined value 244-248 for an appropriate dwell time, the controller 108 may set the control signals 114 to activate the appropriate alert device 106a-106f.

In some situations, the detected values 242 transferred from the detectors 104a-104g to the controller 108 do not exceed at least the first predetermined value 244. The controller 108 may conclude that no subjects 84 are within the unacceptable proximity range 176. In response, the controller 108 may adjust the control signals 114 to turn off the alerts 114.

Where a detection event of a subject 84 within the unacceptable proximity range 176 begins and/or ends, the controller 108 may optionally generate a message to the remote system. The message may include information such as what time the event started/stopped, how may subjects 84 where detected, which predetermined values 244-248 where exceeded, and how long the subjects 84 where inside the unacceptable proximity range 176. The message is subsequently transferred (e.g., via the transmitter 132) to the remote system for storage and further processing. Various embodiments of the disclosure may provide a low-cost wearable apparatus (or system) and/or technique that can detect the proximity of other people and warn the user 80 of when they are getting too close per social distancing standards to another person, and/or when a group of people is forming in an area that is close to or exceeding allowable sizes. The proximity detection apparatus 100 may detect how close other people are and proceed to inform the user 80 of the proximity or group size through increasing intensity, such as an audible beep, a vibration, a frequency, an appearance, and so on.

The proximity detection apparatus 100 may be configured to inform to the user 80 of the direction of the other people approaching at an unsafe distance and/or that groups are forming nearby. For example, if the alert devices 106 are mounted on the belt 160 or the bracelet 162, multiple (e.g., four) alert devices 106 may each be located cardinally to the user 80, each 90 degrees from each other. Individual or combinations of the alert devices 106 could subsequently be asserted with variable characteristics to inform the user 80 of the location of the other person(s). The variable characteristics may also inform the user 80 if another the other person was navigating around the user 80. The individual alert devices 106 would handoff signaling the alerts 112 to each adjacent alert device 104 as the movement around the user 80 occurs. Movement of the alerts 112 would generally help user 80 with hearing loss or eyesight problems during social distancing.

The proximity detection apparatus 100 may notify the user 80 of other approaching people for safe social distancing. The notifications can train the users 80 to be more cognizant of social distancing and large groups. The proximity detection apparatus 100 may be used as a tool for industrial engineers to reconsider workflow and scheduling of workers to be mindful of social distancing safety. The proximity detection apparatus 100 may also detect a "warm body" or detect other units of the devices.

The information provided to the user 80 may be a tool to assist with factory flow optimization of workers. The proximity detection apparatus 100 may enable interlock devices to allow workers to work with robots or automation by detecting human presence. The wearable proximity detection apparatus 100 breaching a "keep-out zone" may digitally initiate a kill switch of a piece of automation. The proximity detection apparatus 100 can inform the user 80 of a direction and proximity of a robot just as it does for another people for safe distancing from automation. The proximity detection apparatus 100 may also notify the user 80 of approaching risks, such as a forklift in motion. Machinery (e.g. forklifts) may be informed that the user 80 is present through the proximity detection apparatus 100 and/or machinery operators may be warned that humans are presence. Characteristics of the alerts 112 may be based on the directions, the ranges and/or the number of the subjects 84 that are nearby. The characteristics may increase in intensity based on a proximity of risk to the user 80. For example, if the subjects 84 are forming a group larger than a designated size, the risk generally increases.

In another aspect of the present disclosure, an exemplary embodiment of a remote monitoring system is provided for communicating with a plurality of proximity detection devices, and monitoring proximity events for the plurality of proximity detection devices. The monitoring system may then produce analytical data trending and create reports for facility managers/users. The use of these reports could span multiple areas such clustering of wearers, inducing/sending an alert to users in risky areas, reporting if changes in a facility operating parameter induces changes to the clustering or movement of wearers, and how long a wearer spends in a particular area of a facility.

In various embodiments, the functionality of the system may also detect a risk resulting from an abundance of subjects 84 near to the user 80. The detected risk may be based on forming group sizes rather than on proximity. In some situations, the contaminant/infectious agent 86 may be biological. In other situations, the subjects 84 may be of concern to the user 80. For example, the proximity detection apparatus 100 could alert the user 80 to a close approach of a subject 84 with reduced visibility because they are, for example, pushing a large cart, driving a forklift or operating a scissor lift.

In some situations, the contaminant/infectious agent 86 may be chemical. For example, the subjects 84 may be using chemicals for certain jobs that deteriorate the quality of the surrounding air, such as Methyl n-Propyl Ketone (MPK). Alerts from the proximity detection apparatus 100 may aid in insuring that too many individuals are not using such chemicals at the same time in small areas, or that the air quality can drop below safe levels.

The proximity detection apparatus 100 may be used to identify individuals that have been exposed to a risk. If a fire alarm is triggered in a building, the network monitor 370 may contact the controllers 108 within range to "search" the building for individuals near the fire and thus sensing unusually high infrared reading from the detectors 104. In another example, a deaf person or a person inside a confined space (e.g., an airplane, a tunnel, a mine, etc.) with hearing protection on might not hear the alarm and/or instructions. A message from a remote system may cause the controller 104 to activate a tactile alert 112 to notify such a person to be attentive. Messages from the controllers 108 back to the remote system may also be useful to check if everyone has evacuated the confined space and/or if a person has stopped moving. The proximity detection apparatus 100 is suitable for use in confined space jobs, for being able to find people in the event of an evacuation, check on a worker's well-being, help emergency response rapidly find a person (a deaf/blind person) in a fire or natural disaster, or a person who loses consciousness.

The proximity detection apparatus 100 may be configured to send signals to other systems to set the detection based on an individual's "threat level." For example, while mass antibody testing is being conducted in a state, region or city, the proximity detection apparatus 100 of a person already having the antibodies may not send alert signals, or to send lesser alert signals to others to maintain a predetermined distance. In another example, where a worker is using a chemical that others should avoid inhaling, the worker's device may be set to push signals for a higher alerts to other users compared to someone who is not using the chemical. The alert levels may be set through the user interface 364 where a switch is available set the level to alert others of a various environment.

In embodiments that are implemented with smart glasses (e.g., 100*c*), the system may be integrated with augmented reality and/or virtual reality technologies to inform the user 80 of the surrounding environment through these interfaces. For example, a user 80 walking down a hall and turning a corner may to come face to face with a subject 84 in the absence of an alert. If the user 80 is wearing a smart glass-based system, the user 80 may receive an audible or haptic alert 114, and the glasses may display a notification to the user 80 essentially giving the user 80 "x-ray" vision through the walls, thereby enabling the user 80 to detect and avoid a potential close contact with the subject 84.

The proximity detection apparatus 100 may be implemented into workplace scheduling. For example, the proximity detection and reporting of the proximity detection apparatus 100 may be used to analyze jobs to determine how job sequencing and flow may be restructured to abide by social distancing. The proximity detection apparatus 100 provides a tool to schedulers and industrial engineers to help review where and when paths are crossing too close and too often so that the work may be re-planned accordingly and immediately check to see if the system informs that the changes resulted in improvements through reductions in recorded instances. Data gathered by the proximity detection apparatus 100 may bring to light how scheduling and work flow leads to groups forming. Furthermore, the data is generally useful to identify when and where groups form, such as at the tool crib were workers checkout tools. By rescheduling and trial-and-error with validations through this system, the schedulers may ensure that checkout times for tools are staggered so that lines do not form there. The same approach may be applied for groups forming in the cafeteria, in the restrooms and other commonly used areas. The schedulers could make changes and continuously improve the scheduling based on seeing what changes lead to improvements and what changes do not result in improvements. The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A proximity detection apparatus for avoidance of nearby subjects, comprising:
    an article for a user;
    a plurality of detectors disposed on the article, each of the plurality of detectors is positioned at a predetermined spacing along the article and spatially oriented in a plurality of directions that establish multiple fields of view that surround the proximity detection apparatus in a horizontal plane, and configured to generate a plurality of detected values in response to sensing infrared radiation emitted from a subject in a vicinity of the article, wherein the plurality of detected values is based on an amount of the infrared radiation detected corresponding to a separation between the article and the subject;
    an electrical connector disposed on the article and configured to receive input of a configuration signal to adjust an unacceptable proximity, wherein the input adjusts a setting of a first predetermined value associated with a proximity condition of the unacceptable proximity, the electrical connector is an electromechanical device used to join electrical conductors and create an electrical circuit, and the configuration signal is an electrical signal;
    an alert device disposed on the article and configured to generate an alert in response to a control signal; and
    a controller in communication with the plurality of detectors, the electrical connector, and the alert device, wherein the controller is configured to set the first predetermined value based on the configuration signal, determine that the subject is within the unacceptable proximity when one or more of the plurality of detected values exceeds the first predetermined value, and generate the control signal to the alert device to present the alert to inform the user that the subject is within the unacceptable proximity.

2. The proximity detection apparatus of claim 1, wherein the subject is a plurality of subjects, the plurality of detectors are spatially oriented in the plurality of directions to individually detect the plurality of subjects in the vicinity of the proximity detection apparatus, the controller is configured to detect one or more of the plurality of subjects within the unacceptable proximity by comparing each of the plurality of detected values with the first predetermined value, and the controller is configured to generate a plurality of control signals in response to the plurality of detected values that exceeds the first predetermined value.

3. The proximity detection apparatus of claim 2, wherein the alert device comprises a plurality of alert devices that are each positioned at a different location on the article, and the plurality of alert devices are configured to generate a plurality of alerts in response to the plurality of control signals.

4. The proximity detection apparatus of claim 3, wherein the controller is further configured to determine each direction toward each of the plurality of the subjects that are within the unacceptable proximity, and generate the plurality of control signals to present a corresponding alert to the user in each direction of a corresponding subject determined to be within the unacceptable proximity.

5. The proximity detection apparatus of claim 2, wherein the controller is further configured to generate the plurality of control signals to adjust one or more of an amplitude of the alert, a frequency of the alert, a visual aspect of the alert, a duty cycle of the alert, or any combination thereof in response to a number of the plurality of detected values that exceeds the first predetermined value.

6. The proximity detection apparatus of claim 2, wherein the controller is further configured to generate the plurality of control signals to command the alert device to generate the alert and a warning to the user while a number of the proximity conditions that are true exceeds a warning value to inform the user that a group of the plurality of subjects are nearby, wherein the warning is separate from the alert.

7. The proximity detection apparatus of claim 1, further comprising a transmitter in communication with the controller, wherein the controller is further configured to transmit a message signal through the transmitter to an external device in response to detection of the subject within the unacceptable proximity.

8. The proximity detection apparatus of claim 1, wherein the article is a wearable article, and the wearable article is a belt, a bracelet, eyeglasses, a hat, a necklace, an anklet, a glove, a shoe attachment, a leg band, a clip or an arm band.

9. The proximity detection apparatus of claim 1, wherein each of the plurality of detectors is a passive infrared sensor that generates a detected voltage value that increases with an increase of the infrared radiation as the subject comes closer to the plurality of detectors, and the controller is configured to adjustably set the first predetermined value associated with the proximity condition of the unacceptable proximity to a select voltage threshold, and adjust a distance of the unacceptable proximity in determining when the detected voltage value resulting from the infrared radiation from the subject exceeds the select voltage threshold.

10. The proximity detection apparatus of claim 1, wherein the alert device is one or more of an acoustic device, a tactile device, a visual device, or any combination thereof.

11. The proximity detection apparatus of claim 1, wherein the article is configured to be worn by an assembly operator in a facility.

12. The proximity detection apparatus of claim 1, wherein the subject is a person, a vehicle, a robotic device, an object at a fixed location, or any combination thereof.

13. The proximity detection apparatus of claim 1, wherein the alert remains active during a duration that the one or more of the plurality of detected values exceeds the first predetermined value for determining that the subject is within the unacceptable proximity, where the subject in the vicinity exposes the user to one or more of a contaminant, an airborne infectious agent, or both.

14. The proximity detection apparatus of claim 1, wherein the controller is further configured to suppress the alert in response to the first predetermined value for the proximity condition being exceeded by the plurality of detected values for less than a dwell time.

15. A method for proximity detection for avoidance of nearby subjects, the method comprising:
donning, by a user, an article having a plurality of detectors, an electrical connector, and an alert device, wherein:
the plurality of detectors is in communication with a controller, each of the plurality of detectors is positioned at a predetermined spacing along the article and spatially oriented in a plurality of directions that establish multiple fields of view that surround the proximity detection apparatus in a horizontal plane, the plurality of detectors is configured to generate a plurality of detected values by sensing infrared radiation emitted from a subject in a vicinity of the article, and the plurality of detected values is based on an amount of the infrared radiation detected corresponding to a separation between the article and the subject,
the electrical connector is in communication with the controller and is configured to receive input of a configuration signal to adjust an unacceptable proximity, the input adjusts a setting of a first predetermined value associated with a proximity condition of the unacceptable proximity, the electrical connector is an electromechanical device used to join electrical conductors and create an electrical circuit, and the configuration signal is an electrical signal, and
the alert device is in communication with the controller and is configured to generate an alert in response to a control signal;
setting, by the controller, the first predetermined value based on the configuration signal;
determining, by the controller, that the subject is within the unacceptable proximity when one or more of the plurality of detected values exceeds the first predetermined value; and
generating, by the controller, the control signal to command the alert device to present the alert to inform the user that the subject is within the unacceptable proximity.

16. The method of claim 15, further comprising:
adjusting the setting of the first predetermined value associated with the proximity condition of the unacceptable proximity to a select value to adjust a distance of the unacceptable proximity in which the subject can intrude.

17. The method of claim 15, further comprising:
suppressing the alert in response to the first predetermined value for the proximity condition being exceeded by the plurality of detected values for less than a dwell time.

18. The method of claim 15, wherein the subject is a plurality of subjects, the method further comprises:
generating, by the controller, the control signal to command the alert device to present the alert and a warning to the user when more than a predetermined number of the plurality of detectors generate the plurality of detected values in excess of the first predetermined value thereby indicating that more than the predetermined number of the plurality of subjects are nearby, wherein the warning is separate from the alert.

19. The method of claim 15, further comprising:
the proximity condition being one of true or false, where the controller is configured for setting the proximity condition to true while one or more of the plurality of detected values is greater than the first predetermined value and less than a second predetermined value for greater than a dwell time, and setting the proximity condition to false while each of the plurality of detected values greater than the first predetermined value is less than the second predetermined value for less than the dwell time, wherein the second predetermined value is greater than the first predetermined value.

20. A method of fabricating a proximity detection apparatus, the method comprising:
positioning a plurality of detectors on an article, each positioned at a predetermined spacing along the article and spatially oriented in a plurality of directions that establish multiple fields of view that surround the proximity detection apparatus in a horizontal plane, and configured to generate a plurality of detected values by sensing infrared radiation emitted from a subject in a vicinity of the article, wherein the article is for a user, and the plurality of detected values is based on an amount of the infrared radiation detected corresponding to a separation between the article and the subject;
positioning an electrical connector on the article, wherein the electrical connector is configured to receive input of a configuration signal to adjust an unacceptable proximity, the input adjusts a setting of a first predetermined value associated with a proximity condition of the unacceptable proximity, the electrical connector is an electromechanical device used to join electrical conductors and create an electrical circuit, and the configuration signal is an electrical signal;
positioning an alert device on the article, wherein the alert device is configured to generate an alert in response to a control signal; and
connecting a controller to the detector, the electrical connector, and the alert device on the article, wherein the controller is configured to set the first predetermined value associated with the proximity condition of the unacceptable proximity based on the configuration signal, determine that the subject is within the unacceptable proximity when one or more of the plurality of detected values exceeds the first predetermined value, and generate the control signal to command the alert device to present the alert to inform the user that the subject is detected within the unacceptable proximity.

* * * * *